US011540437B2

(12) United States Patent
Yagyu et al.

(10) Patent No.: US 11,540,437 B2
(45) Date of Patent: Jan. 3, 2023

(54) SPRAYING SUPPORT SYSTEM FOR WORKING MACHINE

(71) Applicant: KUBOTA CORPORATION, Osaka (JP)

(72) Inventors: Sumio Yagyu, Osaka (JP); Takao Nakagawa, Osaka (JP); Masaru Kawane, Osaka (JP); Yukifumi Yamanaka, Osaka (JP); Go Takaki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 206 days.

(21) Appl. No.: 16/916,299

(22) Filed: Jun. 30, 2020

(65) Prior Publication Data

US 2020/0329632 A1 Oct. 22, 2020

Related U.S. Application Data

(63) Continuation of application No. PCT/JP2019/018090, filed on Apr. 26, 2019.

(30) Foreign Application Priority Data

Apr. 27, 2018 (JP) .............................. JP2018-087252

(51) Int. Cl.
*A01C 15/06* (2006.01)
*A01C 19/02* (2006.01)
(Continued)

(52) U.S. Cl.
CPC .............. *A01C 15/06* (2013.01); *A01C 19/02* (2013.01); *G01C 15/006* (2013.01); *G01C 15/02* (2013.01); *A01B 69/007* (2013.01)

(58) Field of Classification Search
CPC ...................................................... A01C 15/06
See application file for complete search history.

(56) References Cited

U.S. PATENT DOCUMENTS 5,172,861 A * 12/1992 Lenhardt ............... B05B 7/0075
239/78
5,978,723 A 11/1999 Hale et al.
(Continued)

FOREIGN PATENT DOCUMENTS

DE 198 35 487 A1 2/2000
EP 2 944 175 A1 11/2015
(Continued)

OTHER PUBLICATIONS

International Search Report issued in International Patent Application No. PCT/JP2019/018090, dated Jul. 16, 2019 and English Translation thereof.

*Primary Examiner* — Michael A Berns
(74) *Attorney, Agent, or Firm* — Greenblum & Bernstein, P.L.C.

(57) ABSTRACT

A spraying support system for a working machine, includes: a support device including a plan creator portion to create a spraying plan representing a relation between field information relating to a field to which spray substance is sprayed and spraying information including spraying amount of the spray substance; a plan obtainer device provided to a working machine having a sprayer device to spray the spray substance and configured to obtain the spraying plan created by the plan creator portion; and a spraying controller device to control a sprayer portion of the sprayer device based on the spraying information of the spraying plan obtained by the plan obtainer device.

14 Claims, 25 Drawing Sheets

(51) Int. Cl.
*G01C 15/00* (2006.01)
*G01C 15/02* (2006.01)
*A01B 69/00* (2006.01)

(56) References Cited

U.S. PATENT DOCUMENTS

| | | | |
|---|---|---|---|
| 8,412,419 | B1 | 4/2013 | Seamon et al. |
| 10,278,329 | B2 * | 5/2019 | Takahara ................ G06Q 50/02 |
| 10,457,142 | B2 * | 10/2019 | Longua .................. A01D 69/02 |
| 10,575,460 | B2 * | 3/2020 | Davis ..................... G01S 19/42 |
| 10,582,657 | B2 * | 3/2020 | Yagyu ................... A01C 17/005 |
| 11,173,511 | B2 * | 11/2021 | Thompson ................ B05B 1/26 |
| 11,283,381 | B2 * | 3/2022 | Kawane ................. A01B 71/06 |
| 2018/0153100 | A1 | 6/2018 | Takahara et al. |
| 2019/0000012 | A1 | 1/2019 | Yagyu et al. |
| 2019/0116725 | A1 * | 4/2019 | Hanya ............... G06Q 10/06315 |
| 2020/0315084 | A1 * | 10/2020 | Yagyu ................... H02K 7/1807 |
| 2020/0329632 | A1 * | 10/2020 | Yagyu ................... A01C 17/005 |

FOREIGN PATENT DOCUMENTS

| | | | |
|---|---|---|---|
| JP | 2010 104292 | A | 5/2010 |
| JP | 2011 254711 | A | 12/2011 |
| JP | 2012 70667 | A | 4/2012 |
| JP | 2016 171749 | A | 9/2016 |
| JP | 2017 184640 | A | 10/2017 |
| JP | 6214806 | B1 | 10/2017 |

* cited by examiner

FIG.10

| Field identification info. || Field position info. (Latitude/Longitude) |
| --- | --- | --- |
| Name | Address | |
| Field A | Niigata Pref. | 37.764/138.925<br>37.763/138926<br>37.765/138.925<br>37.765/138.926 |
| Field B | Niigata Pref. | ... |
| Field C | Niigata Pref. | ... |

FIG.12

Spraying plan

| Field identification info. | | Time info. | Spraying info. (Spraying amount Kg) | | | | | |
|---|---|---|---|---|---|---|---|---|
| Name | Address | | Q1 | Q2 | Q3 | Q4 | ... | Qn |
| Field A | Niigata Pref. | 2017/10/5 | 2 | 3 | 4 | 2 | ... | 3 |
| Field B | Niigata Pref. | 2017/10/6 | 5 | 2 | 1 | 1 | ... | 4 |
| Field C | Niigata Pref. | 2017/10/7 | 3 | 3 | 3 | 4 | ... | 3 |

FIG.14

| Name | Data | | | | |
|---|---|---|---|---|---|
| | Yield map | Taste map | Growth map | Soil map | Fretilization map |
| FieldA | 2018/9/28 | 2018/9/28 | 2018/7/16 | 2016/3/1 | 2018/7/2 |
| FieldB | 2018/9/2 | 2018/9/2 | 2018/7/1 | 2017/3/1 | 2018/6/15 |
| FieldB | 2018/10/4 | — | 2018/8/4 | 2018/4/6 | 2017/6/22 |

SPRAYING SUPPORT SYSTEM FOR WORKING MACHINE

CROSS-REFERENCE TO RELATED APPLICATIONS

The present application is a continuation application of International Application No. PCT/JP2019/018090, filed Apr. 26, 2019, which claims priority to Japanese Patent Application No. 2018/087252, filed Apr. 27, 2018. The contents of these applications are incorporated herein by reference in their entirety.

BACKGROUND OF THE INVENTION

Field of the Invention

The present invention relates to a spraying support system for a working machine.

Description of Related Art

Japanese Unexamined Patent Application Publication No. 2012-70667 is previously known as a sprayer device for spraying a spray substance such as fertilizer. The sprayer device of Japanese Unexamined Patent Application Publication No. 2012-70667 includes a hopper that stores fertilizer and has an opening hole for feeding the fertilizer, a shutter portion that adjusts the opening amount of the opening hole to adjust the feeding amount of the fertilizer, and a work condition calculator device having an input portion for inputting a traveling speed of a traveling vehicle and a fertilizer spraying amount per unit area.

SUMMARY OF THE INVENTION

A spraying support system for a working machine, comprising: a support device to create a spraying plan representing a relation between field information relating to a field to which spray substance is sprayed and spraying information including spraying amount of the spray substance; a plan obtainer device provided to a working machine having a sprayer device to spray the spray substance and configured to obtain the spraying plan created by the plan creator portion; and a spraying controller device to control a sprayer portion of the sprayer device based on the spraying information of the spraying plan obtained by the plan obtainer device.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is a view illustrating one example of field identifier information and field position information stored in a storage device according to the embodiment;

FIG. 12 is a view illustrating one example of the spraying plan including spraying information, field identifier information, and time information according to the embodiment;

FIG. 14 is a view illustrating one example of configuration where agricultural map data is stored for each field according to the embodiment;

DESCRIPTION OF THE EMBODIMENTS

Figure 1:
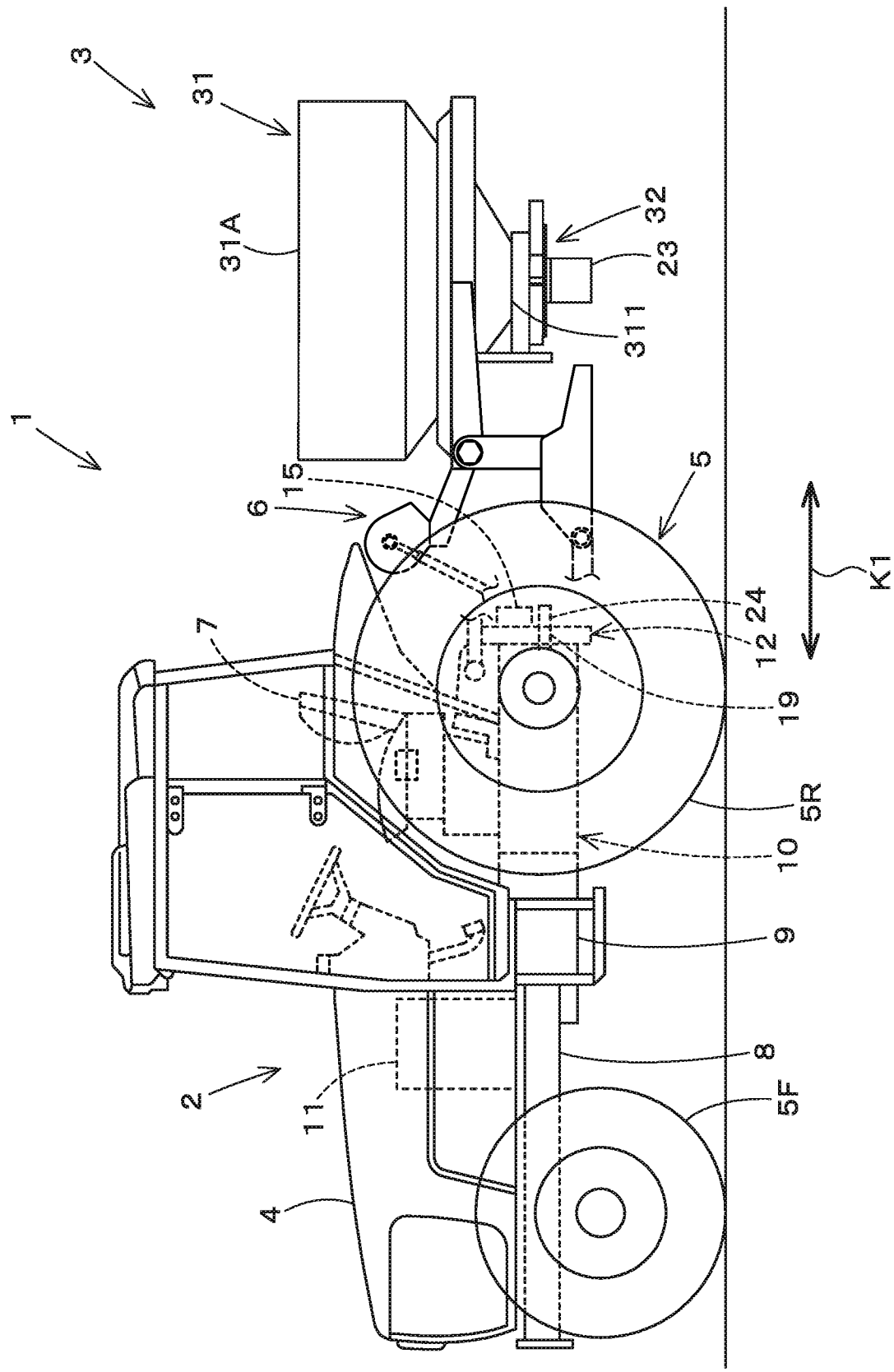
FIG. 1 is a side view illustrating a whole configuration of a working machine according to an embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings as appropriate.

A spraying support system for a working machine is a system for supporting the spraying of the spray substance by the sprayer device 3 which is connected to the working machine 1.

First, the working machine 1 will be described.

Figure 2:
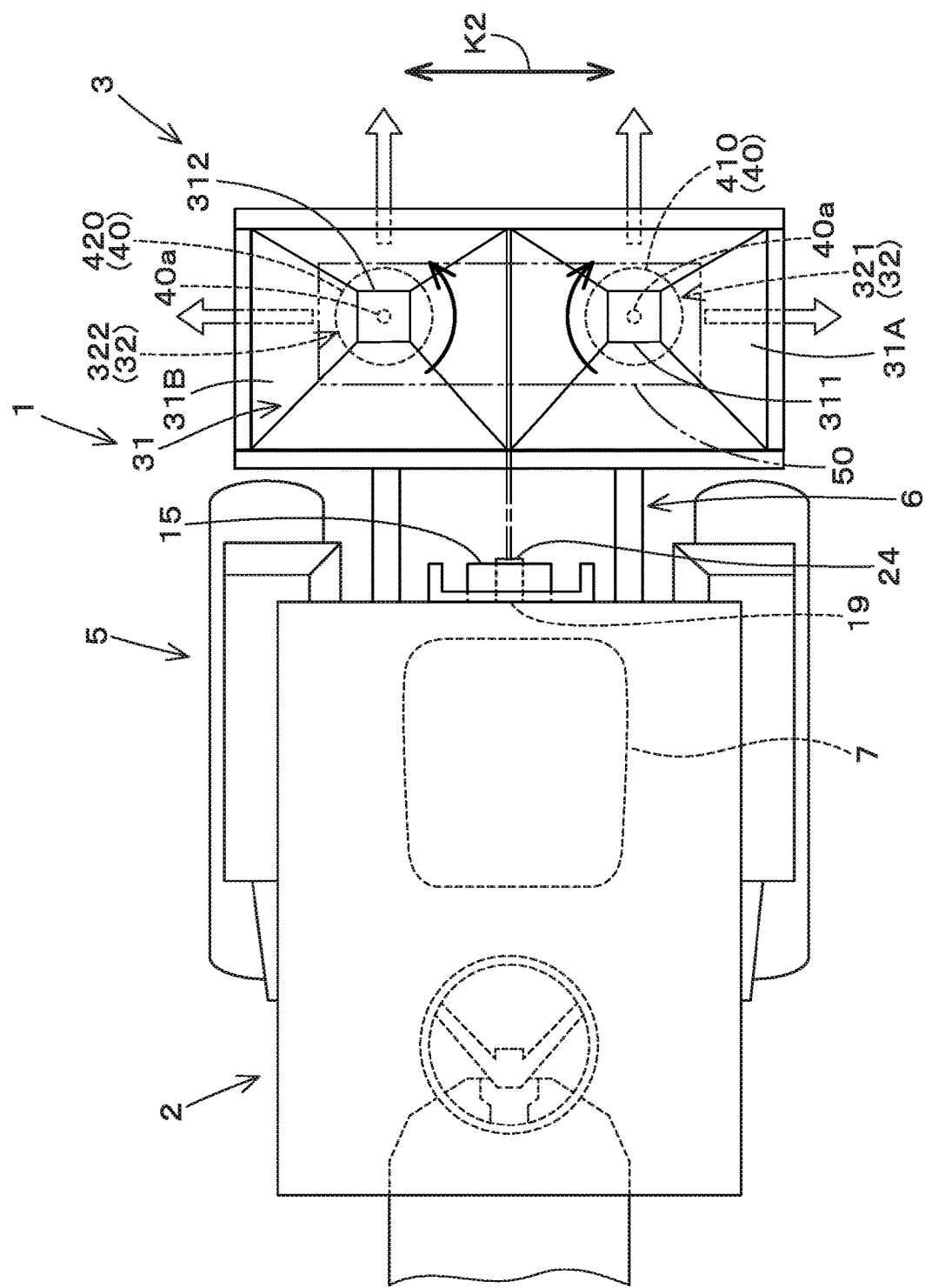
FIG. 2 is a plan view illustrating a rear portion of the working machine according to the embodiment.

FIG. 1 shows a side view of a whole configuration of the working machine 1, and FIG. 2 shows a plan view of the rear portion of the working machine 1.

The working machine 1 includes a traveling vehicle 2 and a sprayer device 3.

The traveling vehicle 2 is a vehicle that travels while towing the sprayer device 3. In the embodiment, since the traveling vehicle 2 is a tractor, the traveling vehicle 2 will be described as the tractor 2 below. However, the traveling vehicle 2 is not limited to a tractor, and may be an agricultural vehicle such as a combine harvester or a rice transplanter, or a construction vehicle. The traveling vehicle 2 may be a pickup truck.

First, the overall configuration of the tractor (traveling vehicle) 2 will be described.

The tractor 2 includes a vehicle body 4, a traveling device 5, and a connector device 6. In the embodiment of the present invention, the front side of a driver sitting on the driver seat 7 mounted on the vehicle body 4 (the left side in FIG. 1) is referred to as the front, the rear side of the driver (the right side in FIG. 1) is referred to as the rear, the left side of the driver (the front surface side of FIG. 1) is referred to as the left, and the right side of the driver (the back surface side of FIG. 1) is referred to as the right. In addition, a horizontal direction K2 (see FIG. 2), which is a direction orthogonal to the front-rear direction K1 (see FIG. 1), will be described as a vehicle width direction.

The vehicle body 4 has a vehicle body frame 8, a clutch housing 9, and a transmission case 10. The vehicle body frame 8 stretches in the front-rear direction of the vehicle body 4. A prime mover 11 is mounted on the vehicle body frame 8. In the embodiment, the prime mover 11 is an internal combustion engine. In particular, the prime mover 11 is an engine, more specifically, a diesel engine. Hereinafter, the prime mover 11 will be described as the engine 11.

The engine 11 is mounted on the vehicle body frame 8 and arranged in the front portion of the vehicle body 4. The clutch housing 9 is connected to the rear portion of the engine 11 and accommodates the clutch. The transmission case 10 is connected to the rear portion of the clutch housing 9 and stretches rearward. The transmission case 10 accommodates a transmission 13 and a rear wheel differential device 14 which will be described later.

The traveling device 5 has a front wheel 5F provided on the front portion of the vehicle body 4 and a rear wheel 5R provided on the rear portion of the vehicle body 4. The front wheels 5F are supported by the vehicle body frame 8. The rear wheel 5R is supported by the output shaft of the rear wheel differential device 14. The traveling device 5 is a tire type in the present embodiment, but may be a crawler type.

The connector device 6 is a device for connecting the sprayer device 3 to the rear portion of the tractor 2. In the embodiment, the connector device 6 includes a three-point link mechanism. The configuration of the connector device 6 is not particularly limited as long as the sprayer device 3 can be coupled to the rear portion of the traveling vehicle 2.

For example, when the traveling vehicle 2 is a pickup truck, the connector device 6 connects the working device 3 by a mechanism other than the three-point link mechanism.

The sprayer device 3 is, for example, a device that sprays spray substances (powder particles) such as fertilizers and chemicals.

Figure 3:
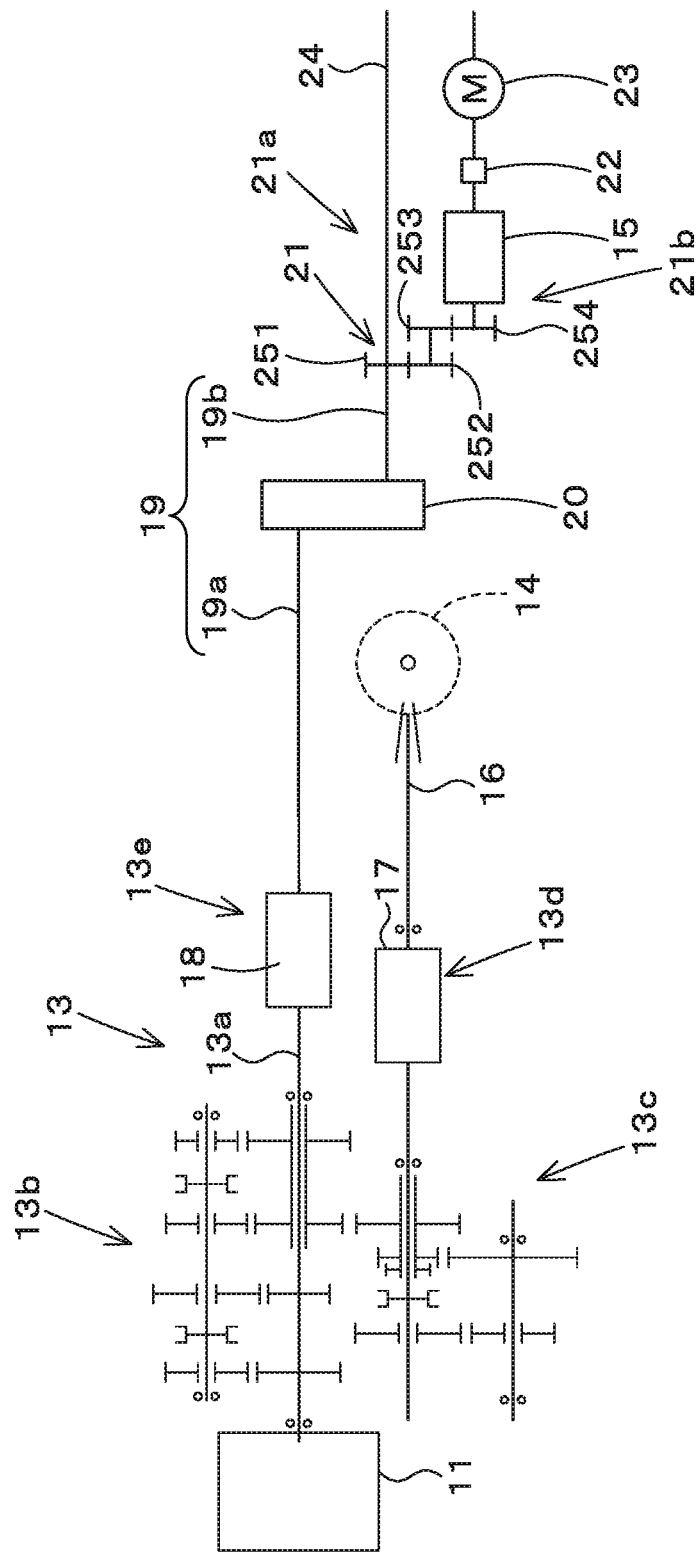
FIG. 3 is a view illustrating a power transmission system of the working machine according to the embodiment.

FIG. 3 shows the power transmission system of the working machine 1.

As shown in FIG. 3, the transmission 13 includes a main shaft (a propulsion shaft) 13a, a main transmission portion 13b, an auxiliary transmission portion 13c, a shuttle portion 13d, and a PTO power transmission portion 13e. The propulsion shaft 13a is rotatably supported by the housing case of the transmission 13, and the power from the crankshaft of the engine 11 is transmitted to the propulsion shaft 13a. The main transmission portion 13b has a plurality of gears and a shifter that changes the engagement of the gears. The main transmission portion 13b changes the rotating speed inputted from the propulsion shaft 13a and outputs (shifts) by appropriately changing the connection (engagement) of the plurality of gears with the shifter.

The sub-transmission portion 13c has a plurality of gears and a shifter for changing the connection of the gears, like the main transmission portion 13b. The sub-transmission portion 13c changes the rotating speed inputted from the main transmission portion 13b and outputs (shifts) the speed by appropriately changing the connection (engagement) of a plurality of gears with the shifter.

The shuttle portion 13d has a shuttle shaft 16 and a forward/backward switching portion 17. The power outputted from the sub-transmission portion 13c is transmitted to the shuttle shaft 16 through gears and the like. The shuttle shaft 16 is provided with the rear wheel differential device 14. A rear axle that supports the rear wheels is rotatably supported by the rear wheel differential device 14. The forward/reverse switch portion 17 is constituted of, for example, a clutch such as a hydraulic clutch or an electric clutch, and switches the rotation direction of the shuttle shaft 16, that is, the forward and backward movements of the tractor 2 by engaging and disengaging the clutch.

The PTO power transmission portion 13e has a PTO clutch 18 and a PTO shaft 19. The PTO shaft 19 is rotatably supported and can transmit power from the propulsion shaft 13a. The PTO shaft 19 has a PTO propulsion shaft 19a and a PTO output shaft 19b. The PTO propulsion shaft 19a is connected to the PTO output shaft 19b via the PTO transmission portion 20. However, the PTO propulsion shaft 19a may be connected to the PTO output shaft 19b without using the PTO transmission portion 20.

The PTO transmission portion 20 can change the rotating speed of the PTO propulsion shaft 19a and transmit the rotating speed to the PTO output shaft 19b by using an operating portion such as a PTO transmission lever. The PTO transmission portion 20 includes a speed-changing actuator such as an electromagnetic solenoid or an electric motor that can operate the operating portion based on a control signal from the controller portion (vehicle-side ECU).

The PTO clutch 18 is a clutch that can be switched between an engaging state in which the power of the propulsion shaft 13a is transmitted to the PTO shaft 19 and a disengaging state in which the power of the propulsion shaft 13a is not transmitted to the PTO shaft 19. In particular, the PTO clutch 18 is provided between the propulsion shaft 13a and the PTO propulsion shaft 19a. The PTO clutch 18 is constituted of a hydraulic clutch, an electric clutch, or the like, and when the clutch is engaged or disengaged, it is possible to switch the state between the state in which the power of the propulsion shaft 13a (power of the engine 11) is transmitted to the PTO shaft 19 and the state in which the power of the propulsion shaft 13a is not transmitted to the PTO shaft 19.

A power divider portion 21 is provided in the middle portion of the PTO output shaft 19b. The power divider portion 21 divides the rotational power transmitted to the PTO output shaft 19b into a first route 21a to output from the input shaft 24 connected to the PTO output shaft 19b and a second route 21b to transmit the rotational power to the first generator 15. The power divider portion 21 is a transmission mechanism including gears. However, the power divider portion 21 is not limited to the transmission mechanism having the gear, and may be another transmission mechanism (for example, a mechanism including a pulley and a belt, a mechanism including a sprocket and a chain, or the like).

The first generator 15 provided on the second path 21b is connected to the motor 23 via the inverter 22. The motor 23 is an electric motor, and is driven (rotated) by the power (electric power) from the first generator 15. The inverter 22 serves as a transmission that changes the rotating speed (revolving speed) of the motor 23. The number of the motors 23 to be driven by the power from the first generator 15 may be one or two or more. In the embodiment, the number of the motors 23 to be driven by the power from the first generator 15 is two. Hereinafter, two of the motors 23 will be respectively referred to as a first motor 231 and a second motor 232.

Next, the sprayer device 3 will be described. The sprayer device 3 is driven by the electric power supplied from the tractor 2 in which the generator unit 12 is mounted.

As the sprayer device 3, a device that is capable of operating at a low voltage of 60V or less is preferably used. In particular, as the sprayer device 3, a fertilizer sprayer device for spraying fertilizer or a seed sprayer device for spraying seeds is preferably used.

As shown in FIG. 1 and FIG. 2, the sprayer device 3 includes a housing portion 31 and a spraying portion 32.

The housing portion 31 houses the spray substances (fertilizer, pesticides, and the like) to be sprayed on the field.

The housing portion 31 is constituted of a hopper having a substantially inverted pyramid shape. The hopper includes a first hopper 31A and a second hopper 31B. The first hopper 31A is arranged on one side (the left side) in the vehicle width direction. The second hopper 31B is arranged on the other side (right side) in the vehicle width direction. However, the number of hoppers is not limited. The housing portion 31 has an inlet for the spray substance at the upper end and has an outlet for taking out the spray substance at the lower end. Although the number of outlets is not limited, in the embodiment, it is determined according to the number of rotors (disks) 40 to be described below. In particular, the number of rotors 40 is two, and the number of outlets is also two. Note that the number of rotors 40 may be two and the number of outlets may be one.

The sprayer portion 32 is a working portion of the working device 3, and rotates to perform an agricultural work. The sprayer portion 32 sprays the spray substance stored in the storage portion 31. As shown in FIG. 1 and FIG. 4, the sprayer portion 32 is provided below the housing portion 31. The sprayer portion 32 includes at least two or more sprayer portions. It is preferable that at least two or more sprayer portions have different spraying directions in all of the sprayer portions, but may include sprayer portions having the same spraying direction.

As shown in FIG. 2, the sprayer portion 32 includes a first sprayer portion 321 and a second sprayer portion 322. That is, in the embodiment, the number of the sprayer portions 32 is two. However, the number of the spray parts 32 is not limited to two, and may be three or more. The number of the sprayer portions 32 and the number of the rotors 40 are the same. The first sprayer portion 321 and the second sprayer portion 322 are provided along with the vehicle width direction. Hereinafter, the two sprayer portions (the first sprayer portion 321 and the second sprayer portion 322) will be described below.

The first sprayer portion 321 is arranged at the one side (the left side) of the vehicle width direction. The second spreader portion 322 is arranged at the other side (the right side) of the vehicle width direction. As shown in FIG. 2 and FIG. 4, the first spreader portion 321 has a first rotor 410 and a first shutter device 411.

The first rotor 410 has a disk shape and rotates about a center axis 40*a* extending in the longitudinal direction (the vertical direction). A plurality of rotor blades (blade members) 40*b* are attached to the upper surface of the first rotor 410. The rotor blade 40*b* rotates about the center axis 40*a* together with the first rotor 410. The plurality of rotor blades 40*b* are arranged at intervals in the circumferential direction, and extend from the vicinity of the center axis 40*a* toward the radially outward direction. The first rotor 410 rotates about the center axis 40*a*, so that the spray substance falling from the first outlet 311 is applied to the rotary blades 40*b* to be scattered radially outward (radially outward).

The first shutter device 411 has a shutter and an electric motor (not shown in the drawings). The shutter is attached to one of the outlets (a first outlet) 311 of the housing portion 31, and the area (opening) of the first outlet 311 can be changed by moving the shutter. The electric motor is a stepping motor or the like, and is connected to the shutter. The first shutter device 411 changes the opening degree of the first outlet 311 by moving the shutter by driving the electric motor. As the result, the amount of spray substance from the first sprayer 321 is adjusted.

As shown in FIG. 5 and FIG. 6, the second sprayer portion 322 includes a second rotor 420 and a second shutter device 421. The configuration of the second rotor 420 is the same as that of the first rotor 410, and thus the description thereof is omitted. The configuration of the second shutter device 421 is the same as that of the first shutter device, except that the shutter is attached to the other outlet (a second outlet) 312 of the housing portion 31. The second shutter device 421 can adjust the spraying amount of the spray substance from the second sprayer portion 322 by changing the opening degree of the second outlet 312.

As shown in FIG. 2, the first rotor 410 and the second rotor 420 are provided side by side in the vehicle width direction. As shown in FIG. 2, the first rotor 410 and the second rotor 420 rotate in mutually different directions. In the embodiment, as shown by the black arrowed line in FIG. 2, the first rotor 410 rotates in the clockwise direction and the second rotor 420 rotates in the counterclockwise direction in plan view.

The first rotor 410 is arranged below the first outlet 311 of the housing portion 31. The spray substance that has fallen from the first outlet 311 is scattered by the rotating first rotor 410. The second rotor 420 is arranged below the second outlet 312 of the housing portion 31. The spray substance falling from the second outlet 312 is scattered by the rotating second rotor 420.

In the embodiment, the spraying directions of the first sprayer portion 321 and the second sprayer portion 322 are different from each other. The spraying direction of the first sprayer portion 321 is one of the vehicle width direction and the rear side. The spraying direction of the second sprayer portion 322 is the other side and the rear side in the vehicle width direction. As shown by the white arrowed line in FIG. 2, in the embodiment, the main spraying directions of the first sprayer portion 321 are left and left rear, and the main spraying directions of the second sprayer portion 322 are right and right rear. The direction indicated by the white arrow is the main spraying direction, and actually it is spread in a fan shape including the direction shown by the white arrow.

Figure 4:
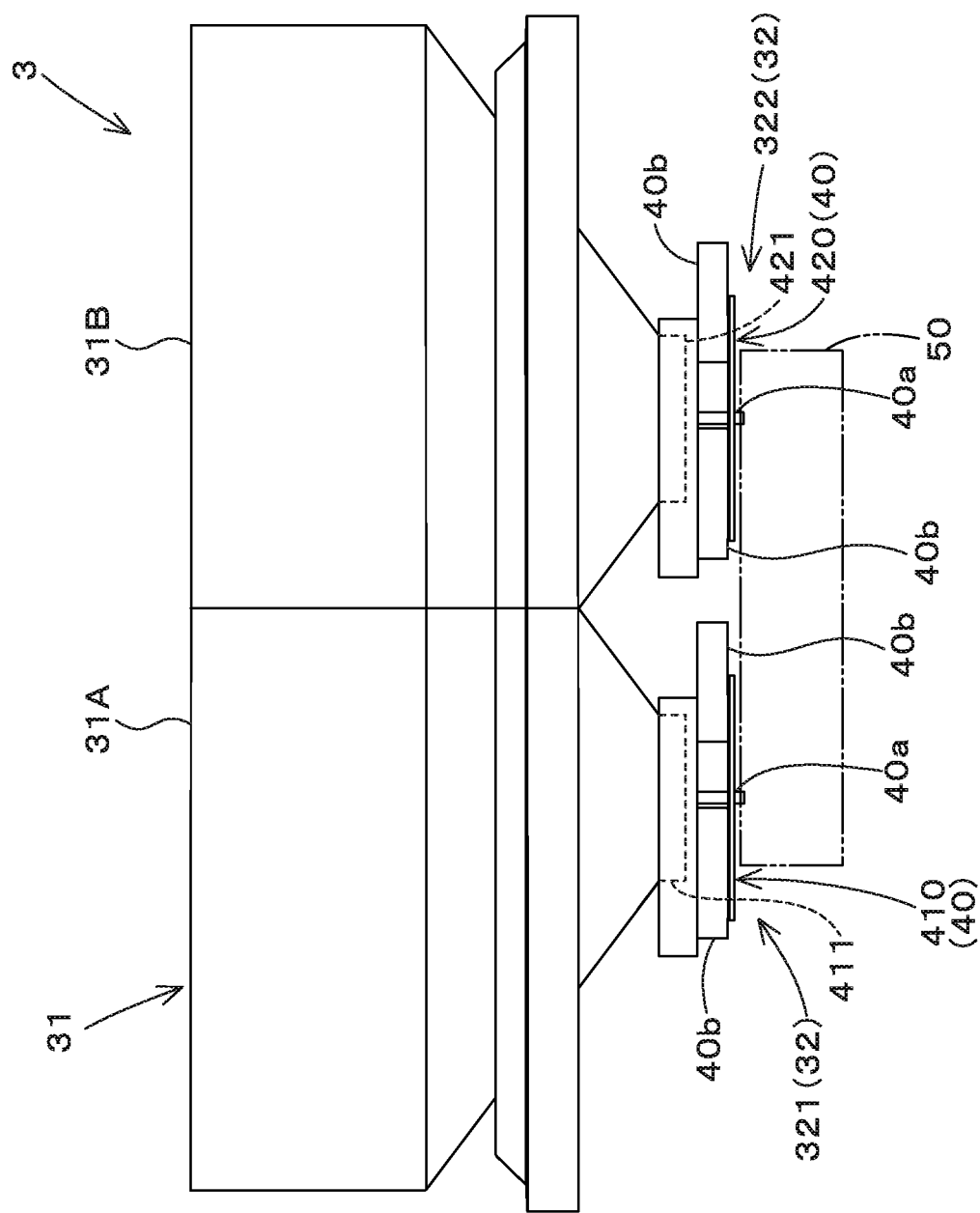
FIG. 4 is a back view of a sprayer device according to the embodiment.
Figure 5:
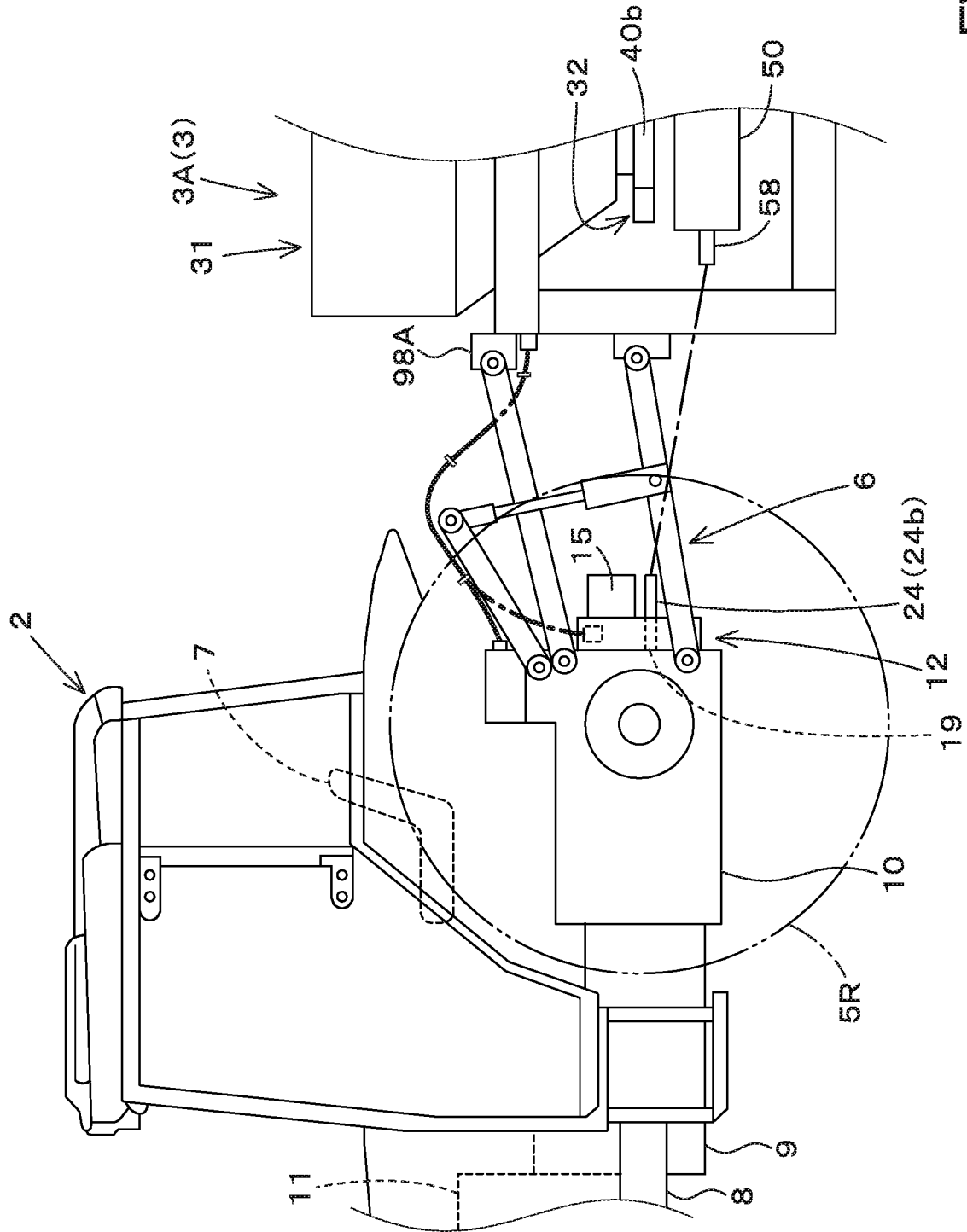
FIG. 5 is a side view illustrating a rear portion of a tractor to which the sprayer device is connected according to the embodiment.
Figure 6:
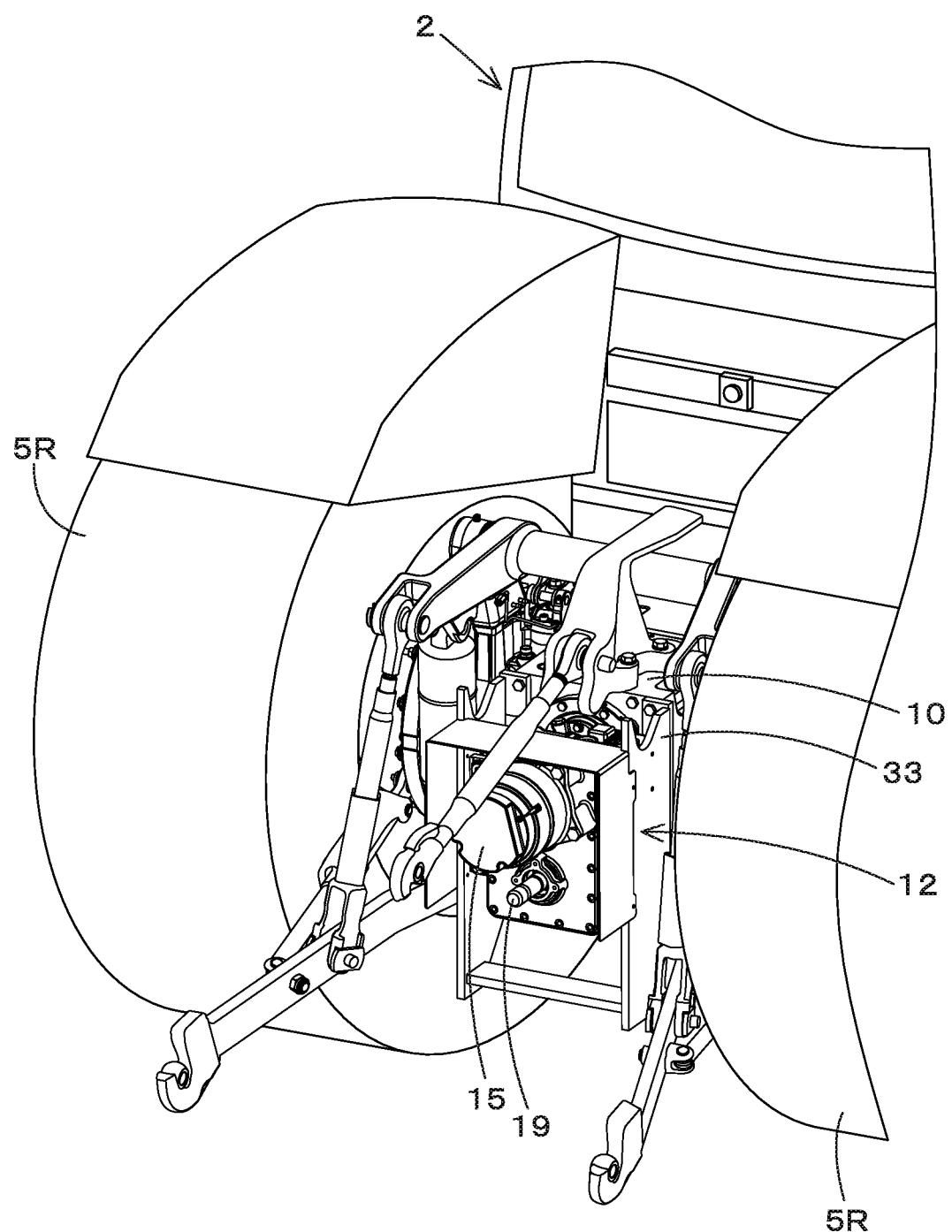
FIG. 6 is a perspective view illustrating a state where a generator unit is attached to the rear portion of the tractor according to the embodiment.

As shown in FIG. 2 and FIG. 4, the sprayer device 3 includes a power transmission mechanism 50. The power transmission mechanism 50 receives the power generated by driving the motor 23 and the power supplied from the engine 11, and transmits the inputted power to the spray unit (working portion) 32. In particular, the power transmission mechanism 50 is a mechanism capable of transmitting the power from the motor 23 and the power from the PTO shaft 19 to the first rotor 410 and the second rotor 420.

The power transmission mechanism 50 will be described below with reference to FIG. 7. However, the power transmission mechanism 50 shown in FIG. 7 is an example, and the configuration of the power transmission mechanism 50 is not limited thereto.

Figure 7:
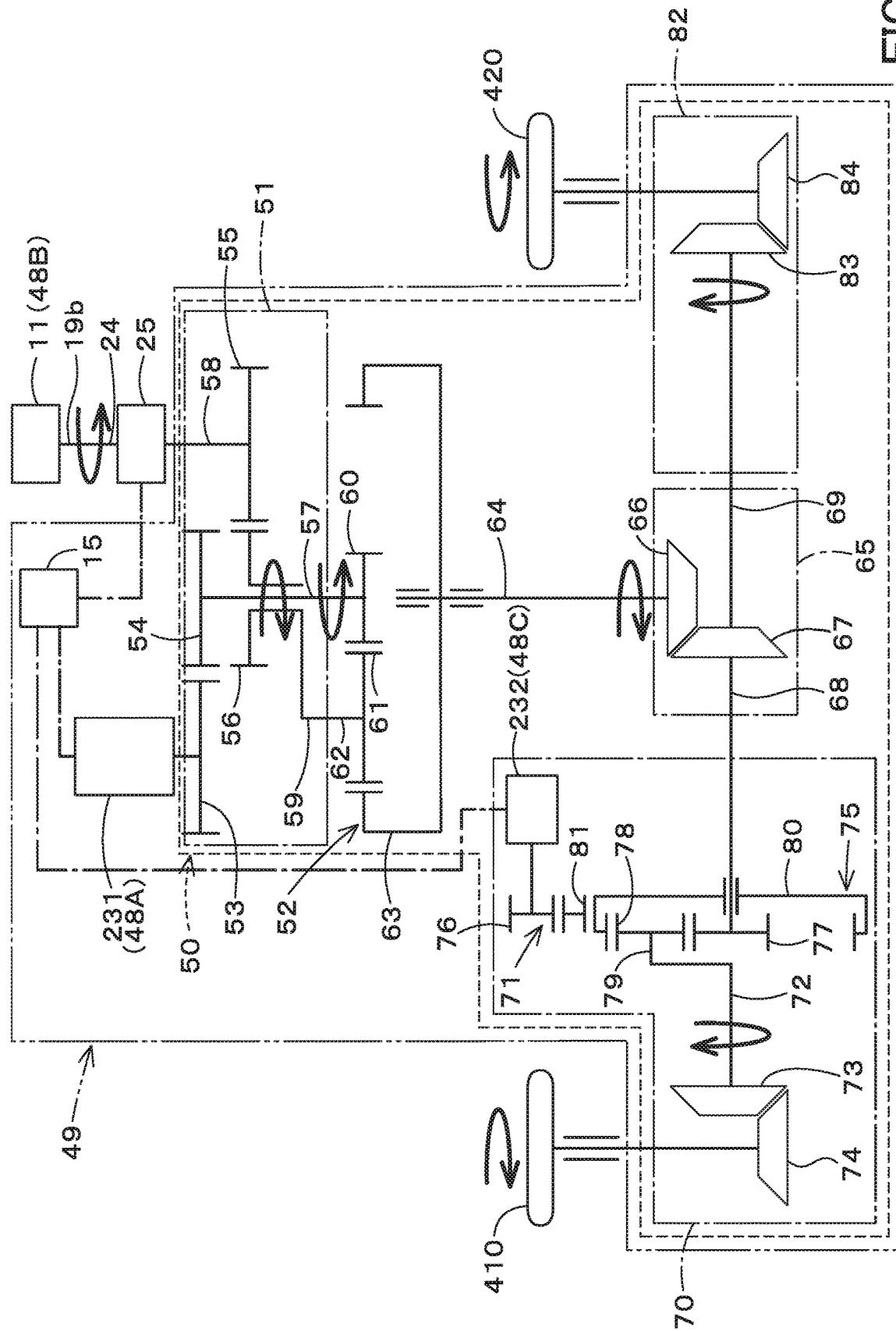
FIG. 7 is a view illustrating a configuration of a driver portion including the power transmission mechanism according to the embodiment.

FIG. 7 shows the configuration of the driver portion 49 including the power transmission mechanism 50. The driver portion 49 has a first driving source 48A, a third driving source 48C, and a power transmission mechanism 50. The driver portion 49 is provided in the sprayer device 3 and drives the sprayer portion 32.

The sprayer portion 32 is driven by power from a drive source (first driving source 48A, third driving source 48C) included in the driver portion 49 and by power from another drive source (second driving source 48B) included in the tractor 2.

The first driving source 48A and the third driving source 48C are variable-speed drive sources included in the driver portion 49 of the sprayer device 3. In the embodiment, the first driving source 48A and the third driving source 48C are the first motor 231 and the second motor 232 that are driven by the power from the generator 15, respectively. The second driving source 48B is the engine 11 provided in the tractor 2.

The power transmission mechanism 50 can transmit the power from the first driving source 48A and the power from the second driving source 48B to the rotors (the first rotor 410 and the second rotor 420) of the sprayer portion 32. In particular, the power transmission mechanism 50 can transmit the power of the first driving source 48A to the first rotor 410 and the second rotor 420, and can transmit the power of the second driving source 48B to the first rotor 410 and the second rotor 420. The third driving source 48C is a drive source mainly used for changing the rotating speeds of the first rotor 410 and the second rotor 420.

The power transmission mechanism 50 has an input transmission portion 51 and a first planetary gear mechanism 52.

The input transmission portion 51 transmits the power inputted from the first driving source 48A and the power inputted from the second driving source 48B to the first planetary gear mechanism 52. The input transmission portion 51 has a first input gear 53, a second input gear 54, a third input gear 55, a fourth input gear 56, a first shaft 57, a second shaft 58, and a third shaft 59. The first input gear 53 is connected to the output shaft of the first motor 231, and is rotated by driving the first motor 231. The second input gear 54 engages with the first input gear 53, and rotates with the rotation of the first input gear 53. One end of the first shaft 57 is connected to the center of the second input gear 54. One end of the second shaft 58 is connected to the center of the third input gear 55. The other end of the second shaft 58 is connected to the second connector portion of the input shaft 24 via a connecting tool (universal joint or the like). Rotational power from the engine 11 is inputted to the input shaft 24 through the PTO output shaft 19b. The rotational power inputted to the input shaft 24 is branched into two paths. The rotational power branched into the two paths is transmitted to the generator 15 through the transmission mechanism 25, and the other is transmitted from the second connector portion of the input shaft 24 to the second shaft 58.

The fourth input gear 57 engages with the third input gear 55 and rotates with the rotation of the third input gear 55. One end of the third shaft 59 is connected to the fourth input gear 57.

The first planetary gear mechanism 52 has a first sun gear 60, a first planetary gear 61, a first planetary carrier 62, and a first internal gear 63. The first sun gear 60 engages with the first planetary gear 61. The first planetary gear 61 is rotatably supported by the first planetary carrier 62, and can rotate (revolve) around the first sun gear 60. The first planet carrier 62 rotates as the first planetary gear 61 rotates (revolves). The first internal gear 63 engages with the first planetary gear 61. The other end of the third shaft 59 is connected to the first planetary gear 61. As the result, the first planetary gear 61 rotates (revolves) around the first sun gear 60 as the fourth input gear 57 rotates, and the first internal gear 63 rotates as the first planetary gear 61 rotates.

An output transmission shaft 64 that outputs power from the first planetary gear mechanism 52 is connected to the first planetary gear mechanism 52. One end side of the output transmission shaft 64 is connected to the center of the first internal gear 63. The other end of the output transmission shaft 64 is connected to a separation transmission portion 65 described later. As the result, the power outputted from the first planetary gear mechanism 52 to the output transmission shaft 64 is transmitted to the separation transmission portion 65.

The separation transmission portion 65 separates and transmits the power outputted from the output transmission shaft 64 into one and the other. The separation transmission portion 65 has a first transmission gear 66, a second transmission gear 67, a first transmission shaft 68, and a second transmission shaft 69. The other end of the output transmission shaft 64 is connected to the center of the first transmission gear 66. The second transmission gear 67 engages with the first transmission gear 66. The gears (the first transmission gear 66 and the second transmission gear 67) that form the separation transmission portion 65 are all bevel gears. The direction of the rotation axis of the first transmission gear 66 intersects the direction of the rotation axis of the second transmission gear 67.

One end of one transmission shaft 68 and one end of the other transmission shaft 69 are connected to the second transmission gear 67, respectively. The one transmission shaft 68 and the other transmission shaft 69 stretch from the center of the second transmission gear 67 toward opposite sides. In this manner, the power outputted from the output transmission shaft 64 is separated and transmitted from the second transmission gear 67 to the one transmission shaft 68 (one side) and the other transmission shaft 69 (the other side) in the separation transmission portion 65.

On the other hand, the transmission shaft 68 is connected to the first power transmission portion 70.

The first power transmission portion 70 transmits, to the first rotor 410, the power transmitted from the separation transmission portion 65 to one side (the one transmission shaft 68). The first power transmission portion 70 has a transmission portion 71, a transmission shaft 72, a third transmission gear 73, and a fourth transmission gear 74.

The transmission portion 71 includes a third driving source 48C. The transmission portion 71 changes the rotating speed of the first rotor 410 or the second rotor 420 according to the speed change of the third driving source 48C. The transmission portion 71 has a second planetary gear mechanism 75 and a drive gear 76.

The second planetary gear mechanism 75 has a second sun gear 77, a second planetary gear 78, a second planetary carrier 79, and a second internal gear 80.

The second sun gear 77 engages with the second planetary gear 78. The second sun gear 77 is connected to the separation transmission portion 65. In particular, the other end of the one transmission shaft 68 is connected to the center of the second sun gear 77. The second planetary gear 78 engages with the second sun gear 77. The second planetary gear 78 is rotatably supported by the second planetary carrier 79, and can rotate (revolve) around the second sun gear 77. The second planet carrier 79 rotates as the second planet gear 78 rotates (revolves).

The second internal gear 80 has internal teeth formed on the inner peripheral surface and external teeth formed on the outer peripheral surface. The inner teeth engage with the second planetary gear 78. The outer teeth engage with the relay gear 81. The relay gear 81 engages with the drive gear 76 that rotates by the power from the third driving source 48C.

The one end side of the transmission shaft 72 is connected to the second planet carrier 79. The other end of the transmission shaft 72 is connected to the center of the third transmission gear 73. The fourth transmission gear 74 engages with the third transmission gear 73. The direction of the rotation axis of the fourth transmission gear 74 intersects the direction of the rotation axis of the third transmission gear 73. The center of the fourth transmission gear 74 is connected to the central axis of the first rotor 410. In this manner, the power of rotation of the fourth transmission gear 74 is transmitted to the first rotor 410.

The second sun gear 77 can transmit power to the second rotor 420 through the separation transmission portion 65. The second planetary gear 78 can transmit power to the first rotor 410 through the second planet carrier 79 and the transmission shaft 72.

In addition, one end side of the transmission shaft 72 is connected to the center of the second sun gear 77, the other end side of the transmission shaft 72 is connected to the center of the third transmission gear 73, and one transmission shaft 68 of the one transmission shaft 68 is connected to the second planet carrier 79. The other end may be connected, and the one end of the one transmission shaft 68 may be connected to the second transmission gear 67. In this case, the second planetary gear 78 can transmit power to the second rotor 420 through the second planetary carrier 79 and the separation transmission portion 65, and the second sun gear 77 can transmit the power to the first rotor 410 through the transmission shaft 72.

On the other hand, the transmission shaft 69 is connected to the second power transmission portion 82.

The second power transmission portion 82 can transmit, to the second rotor 420, the power transmitted from the separation transmission portion 65 to the other (the other transmission shaft 69).

The second power transmission portion 82 has a fifth transmission gear 83 and a sixth transmission gear 84. The gears (the fifth transmission gear 83, the sixth transmission gear 84) forming the second power transmission portion 82 are all bevel gears.

The other end of the other transmission shaft 69 is connected to the center of the fifth transmission gear 83. The sixth transmission gear 84 engages with the fifth transmission gear 83. The direction of the rotation axis of the sixth transmission gear 84 intersects the direction of the rotation axis of the fifth transmission gear 83. The center of the sixth transmission gear 84 is connected to the central axis of the second rotor 420.

The operation (movement) of the driver portion 49 will be described below.

The power from the first driving source 48A is inputted to the first planetary gear mechanism 52 through the input transmission portion 51. Power from the second driving source 48B is inputted to the first planetary gear mechanism 52 through the PTO output shaft 19b, the input shaft 24, the second shaft 58, and the input transmission portion 51.

The power inputted to the first planetary gear mechanism 52 is outputted from the output transmission shaft 64 and transmitted to the separation transmission portion 65. The separation transmission portion 65 separates and transmits the power outputted from the output transmission shaft 64 to one (one transmission shaft 68) and the other (the other transmission shaft 69). That is, the separation transmission portion 65 separates and transmits the power from the first driving source 48A and the power from the second driving source 48B to one side and the other side.

The power transmitted from the separation transmission portion 65 to one side (the one transmission shaft 68) is transmitted to the first rotor 410 through the first power transmission portion 70. The power transmitted from the separation transmission portion 65 to the other (the other transmission shaft 69) is transmitted to the second rotor 420 through the second power transmission portion 82.

Thus, the power from the first driving source 48A can rotate the first rotor 410 and the second rotor 420. In addition, the first rotor 410 and the second rotor 420 can be rotated by the power from the second driving source 48B. That is, the power of either the first driving source 48A or the second driving source 48B can be used to rotate the first rotor 410 and the second rotor 420. In addition, the power of both the first driving source 48A and the second driving source 48B can be used to rotate the first rotor 410 and the second rotor 420. In addition, since the first driving source 48A can change the speed, the rotating speeds of the first rotor 410 and the second rotor 420 can be changed by changing the speed of the first driving source 48A.

In addition, since the power transmission mechanism 50 has the transmission portion 71, the driver portion 49 can make the rotating speed of the first rotor 410 and the rotating speed of the second rotor 420 different from each other.

The operation of the transmission portion 71 will be described below.

When the third driving source 48C of the transmission portion 71 is driven, the power from the third driving source 48C is transmitted to the external teeth of the second internal gear 80 through the drive gear 76 and the relay gear 81. Thus, when the third driving source 48C is driven, the second internal gear 80 rotates. The rotation of the second internal gear 80 is transmitted to the second planetary gear 78 through the internal teeth of the second internal gear 80, and the second planetary gear 78 rotates. The second planet carrier 79 rotates as the second planet gear 78 rotates, and the power of the rotation is transmitted to the first rotor 410 through the transmission shaft 72, the third transmission gear 73, and the fourth transmission gear 74.

In this manner, the power from the transmission portion 71 including the third driving source 48C is transmitted to the first rotor 410. Thus, the rotating speed of the first rotor 410 can be changed according to the shift of the third driving source 48C. In this manner, the rotating speed of the first rotor 410 and the rotating speed of the second rotor 420 can be made different each other.

In addition, the transmission portion 71 may be provided in the second power transmission portion 82, and the power from the third driving source 48C may be transmitted to the transmission portion 71 of the second power transmission portion 82 (external teeth of the second internal gear 80). When this configuration is adopted, the rotating speed of the second rotor 420 can be changed according to the shift of the third driving source 48C. Also with this configuration, the rotating speed of the first rotor 410 and the rotating speed of the second rotor 420 can be made different each other.

As a modified example of the driver portion 49, a switch portion can be provided in the first power transmission portion 70 or the second power transmission portion 82. The switch portion includes, for example, a clutch that can be switched by an operation lever or the like. Preferably, the switch portion is constituted of an electric clutch, but may be constituted of a mechanical clutch. When the switch portion is provided in the first power transmission portion 70, the switch portion is provided in the middle of the one transmission shaft 68, for example. When the switch portion is provided in the second power transmission portion 82, the switch portion is provided in the middle of the other transmission shaft 69, for example.

The switch portion provided in the first power transmission portion 70 allows the power transmitted from the separation transmission portion 65 to one side (the one transmission shaft 68) to be transmitted to the first rotor 410 in the first state and to the first rotor 410. It is possible to switch to the second state in which no transmission is made. The switch portion provided in the second power transmission portion 82 transfers the power transmitted from the separation transmission portion 65 to the other (the other transmission shaft 69) to the second rotor 420 in the first state and to the second rotor 420. It is possible to switch to the second state in which no transmission is made.

Figure 8:
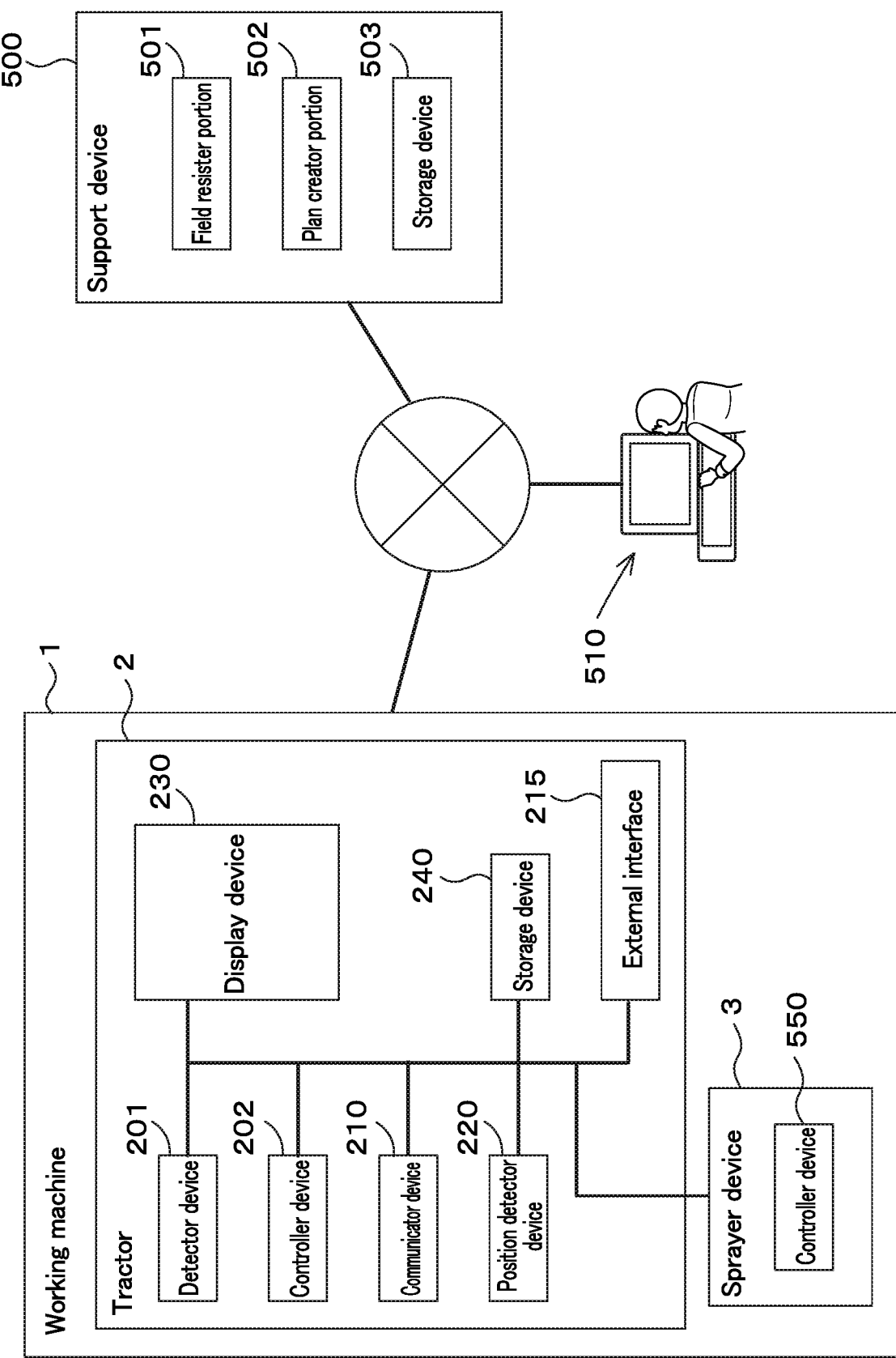
FIG. 8 is a view illustrating a spraying support system for a working machine according to the embodiment.

As shown in FIG. 8, the tractor 2 includes a detector device 201 and a controller device 202. The detector device 201 is a device that detects the state of the tractor 2, and includes an accelerator pedal sensor, a shift lever detection sensor, a crank position sensor, a fuel sensor, a water temperature sensor, an engine rotation sensor, a steering angle sensor, an oil temperature sensor, and an axle rotation sensor, a sensor such as an operation amount detection sensor, an ignition switch, a parking brake switch, a PTO switch, a switch such as an operation switch, and the like. The controller device 202 is a device that controls the tractor, and is a CPU or the like. The controller device 202 controls the traveling system and the working system of the tractor 2 based on the detection value and the like detected by the detector device 201. For example, the controller device 202 detects the operation amount of the operation tool for moving the connector device 6 up and down by the operation amount detection sensor, performs the control for moving the connector device 6 up and down based on the operation amount, or performs the control of rotating speed of the engine 11 based on the operation amount detected by the accelerator pedal sensor. The controller device 202 may be any device that controls the work system and the travel system of the tractor 2, and the control method is not limited thereto.

The tractor 2 includes a communicator device 210. The communicator device 210 is a communication module that performs either direct communication or indirect communication with the support device 500, and performs wireless communication in Wi-Fi (Wireless Fidelity, registered trademark) of IEEE 802.11 series which is a communication standard, BLE (Bluetooth (registered trademark) Low Energy), LPWA (Low Power, Wide Area), LPWAN (Low-Power Wide-Area Network), or the like, for example. In addition, the communicator device 210 can perform wireless communication through a mobile phone communication network or a data communication network, for example.

The tractor 2 includes a position detector device 220. The position detector device 220 is mounted on the top plate of the cabin 2A of the tractor 2. The position detector device 220 is mounted on the top plate of the cabin 2A, but the mounting position on the tractor 2 is not limited thereto, and may be another position. In addition, the position detector device 220 may be attached to the sprayer device 3.

The position detector device 220 is a device that detects the own position (positioning information including latitude and longitude) by a satellite positioning system. That is, the position detector device 220 receives a signal (position of the positioning satellite, transmission time, correction information, and the like) transmitted from the positioning satellite, and detects the position (latitude, longitude) based on the received signal. The position detector device 220 may detect a position corrected based on a signal such as a correction from a base station (reference station) capable of receiving a signal from a positioning satellite as the own position (latitude, longitude). In addition, the position detector device 220 may have an inertial measurement device such as a gyro sensor or an acceleration sensor, and the position corrected by the inertial measurement device may be detected as the own position.

According to the above, the position detector device 220 detects the position of the tractor 2, that is, the position of the sprayer device 3 connected to the tractor 2. In other words, the position detector device 220 detects the position of the working machine 1 (the tractor 2, the sprayer device 3).

The tractor 2 includes a display device 230. The display device 230 is a device capable of displaying various types of information, and is a device having any one of a liquid crystal panel, a touch panel, and other panels. The display device 230 is connected to the detector device 201, the controller device 202, the communicator device 210, and the position detector device 220 through an in-vehicle network. The display device 230 can acquire and display the spraying plan created by the support device 500 through the communicator device 210 or the like. Any one of the controller device 202, the communicator device 210, and the display device 230 sequentially stores a detection value detected by the detector device 201, a position (a detected position) detected by the position detector device 220, information relating to the work transmitted from the sprayer device 3, and the like under a state where at least the tractor 2 is operating. Then, the stored information is stored as the work record.

As shown in FIG. 8, the spraying support system for the working machine includes a support device 500. The support device 500 is a device that provides various supports for spraying the spray substance, and is, for example, a server installed in a farmer, a farming company, an agricultural machine maker, an agricultural service company, or the like. An external terminal 510 possessed by an administrator, a worker, or the like can be connected to the support device 500. The external terminal 510 is a personal computer, a smartphone, a tablet computer, a PDA, or the like.

The support device 500 includes a field register portion 501, a plan creator portion 502, and a storage device 503. The field register portion 501 and the plan creator portion 502 are constituted of electric/electronic components provided in the support device 500, computer programs stored in the support device 500, or the like. The storage device 503 is constituted of a non-volatile memory or the like.

<Registration of Field (Field Register Portion)>

The field register portion 501 registers field information regarding an agricultural field. When the external terminal 510 is connected to the support device 500 and a request for registration of field information is made from the external terminal 510 to the support device 500, as shown in FIG. 9, the field register portion 501 displays a registration screen in response to the request, then displays a registration screen M1 on the external terminal 510.

Figure 9:
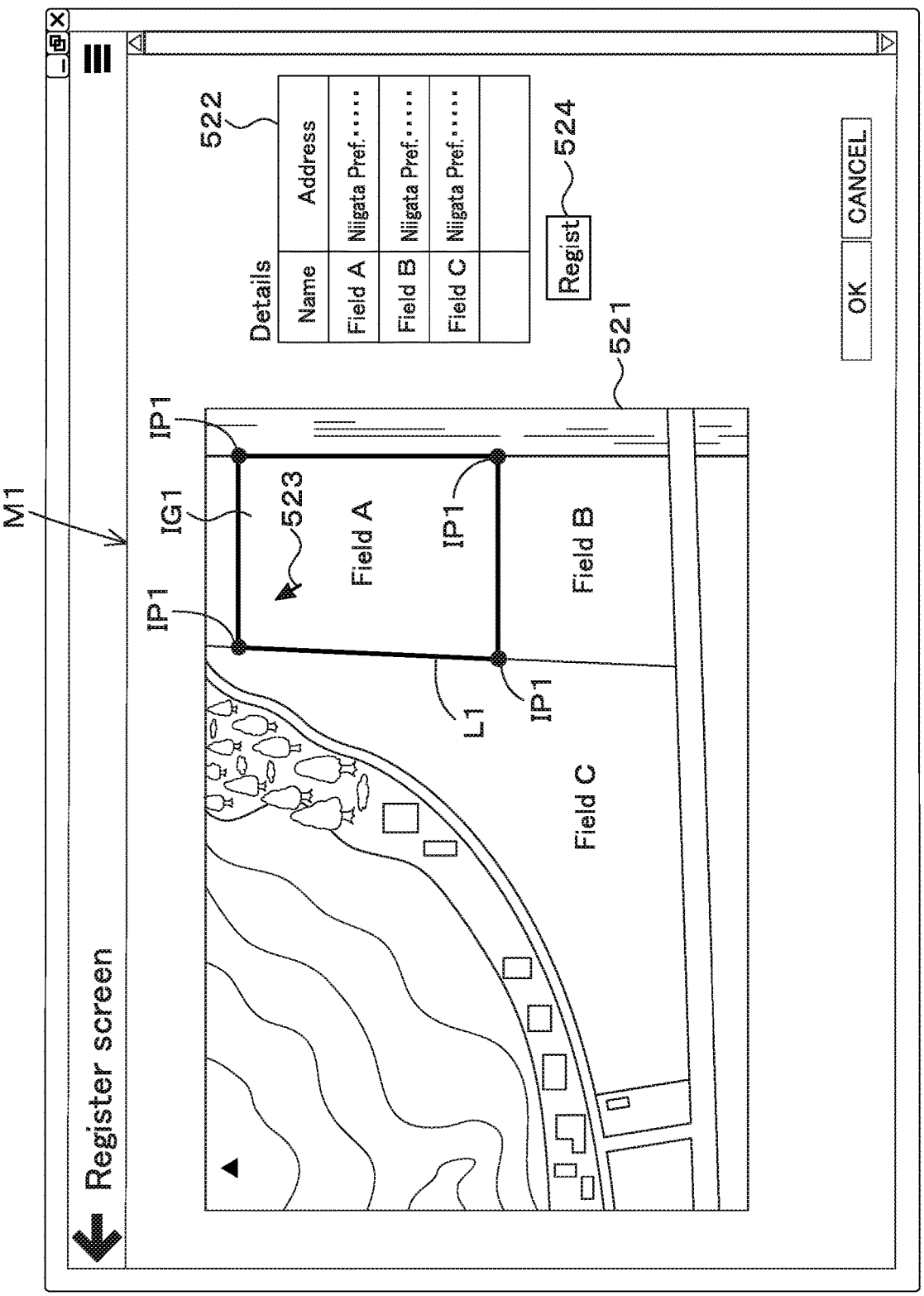
FIG. 9 is a view illustrating one example of a resister screen M1 according to the embodiment.

As shown in FIG. 9, the registration screen M1 includes a map display portion 521 for displaying a map of the field and an input portion 522 for inputting details of the field. The field register portion 501, for example, connects to a server or the like provided by a map provider company and acquires map data including an agricultural field. After acquiring the map data, the field register portion 501 displays the acquired map data on the map display portion 521. The map data includes a field image IG1 obtained by capturing an image of the field from above, and position information (latitude, longitude) assigned to pixels of the field image IG1. On the map display portion 521, a pointer 523 that can select an arbitrary point (coordinate) in the field image IG1 is displayed. The pointer 523 can move on the map display portion 521 using an input interface such as a mouse, a keyboard, a finger, and a pen.

On the registration screen M1, a plurality of arbitrary points of the field image IG1 are designated while the field image IG1 is displayed on the map display portion 521. For example, as shown in FIG. 9, when four points are designated by the pointer 523 in the field image IG1, the field register portion 501 sets the line L1 connecting the four designated points IP1 as the contour of the field and the contour. Position information (latitude, longitude) of four designated points IP1 indicating L1 is held. That is, when the administrator, the worker or the like selects four designated points IP1 with the pointer 523 in the field image IG1 displayed on the map display portion 521, the selection of the field contour L1, that is, the field L having the field contour L1 (an agricultural field A) completes.

After the selection of the field, information such as the field name and the address of the field, that is, the identification information for identifying the field can be inputted to the input portion 522. When the registration button 524 displayed on the registration screen M1 is selected after inputting the field identification information such as the field name and the field address in the input portion 522, the field register portion 501 registers position information of the designated point IP1 as the position information (field position information) indicating the position of the field and resisters the field name and the field address as the field identification information. That is, the field register portion 501 registers the field position information and the field identification information as the field information.

When the registration of the field information (registration of the field) is completed on the registration screen M1, the field position information and the field identification information are stored in the storage device 503 for each field, as shown in FIG. 10.

In the above-described embodiment, when four designated points IP1 are designated in the field image IG1, the line L1 connecting the four points is used as the contour. However, the number of designated points IP1 indicating the contour may be at least three or more, and may be five except four. In addition, although the field name and the address of the field are illustrated as the field identification information, the field identification information may be other than the field name and the address of the field.

In the embodiment described above, the field register portion 501 registers both the field position information and the field identification information as the field information, but only the field position information may be registered as the field information. In the above-described embodiment, the field register portion 501 registers the designated point IP1 as the farm position information, but the contour L1 of the agricultural field connecting the designated points IP1 may be registered as map information.

Figure 11:
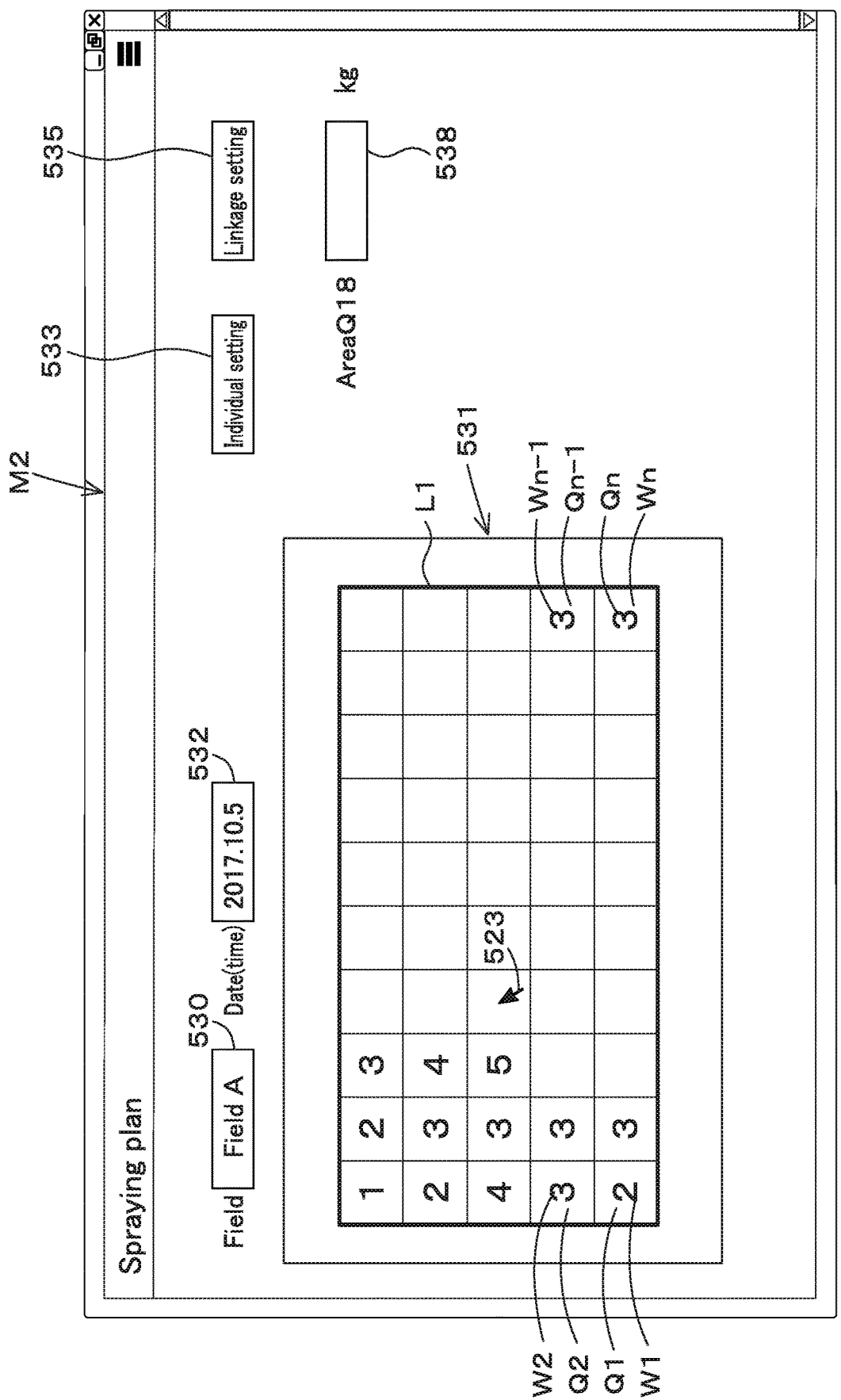
FIG. 11 is a view illustrating one example of a plan screen M2 according to the embodiment.

The plan creator portion 502 creates a spraying plan for spray substances in the field. When the external terminal 510 is connected to the support device 500 and the support device 500 requests the support device 500 to create a spraying plan, the plan creator portion 502 displays a plan screen M2 on the external terminal 510 in response to the request, as shown in FIG. 11.

The planning screen M2 includes an agricultural field selector portion 530 that selects an agricultural field, an agricultural field display portion 531 that displays the agricultural field, and a time setting portion 532 that sets the time. The agricultural field selector portion 530 displays a list of agricultural field identification information registered by the field register portion 501 as described above. When one field identification information is selected from the plurality of field identification information displayed in the field selector portion 530, the plan creator portion 502 sets the spraying plan of the fields (selected fields) corresponding to the selected field identification information. The time setting portion 532 is a part for inputting the time (month, day, time) for performing the spraying.

The plan creator portion 502 displays the outer shape (the contour L1) of the selected field selected by the field selector portion 530 on the field display portion 531. In the field display portion 531, positions (latitude and longitude) are assigned to the fields that depict the fields. In addition, the field in the field display portion 531 is divided into a plurality of areas Qn (n=1, 2, 3, . . . , N), and the spraying amount Wn of the spray substance can be set in each of the divided areas Qn.

For example, when the individual setting button 533 displayed on the plan screen M2 is selected, it is possible to set an arbitrary spraying amount Wn for each area Qn. In particular, when the individual setting button 533 is selected, the plan creator portion 502 displays the pointer 523 for selecting the area Qn on the agricultural field display portion 531. When an arbitrary area Qn is selected with the pointer 523, the plan creator portion 502 displays, on the plan screen M2, a spraying input portion 538 for inputting the spraying amount Wn corresponding to the selected area Qn as shown in FIG. 11. When the spraying amount is inputted to the spraying input portion 538, the plan creator portion 502 sets the inputted spraying amount to the spraying amount Wn of the selected area Qn. Even when a plurality of areas Qn are selected by the pointer 523, the plan creator portion 502 sets the supplying amount inputted to the spraying input portion 538 as the supplying amount Wn in the plurality of areas Qn.

As described above, when the setting of the supplying amount Wn for each area Qn is completed, the plan creator portion 502 stores, to the storage device 503, the spraying information indicating the supplying amount Wn set for each area Qn, the field identification information of the selected field selected in the field selector portion 530, and the spraying plan including the time (time information) inputted to the time setting portion 532, as shown in FIG. 12.

Figure 13:
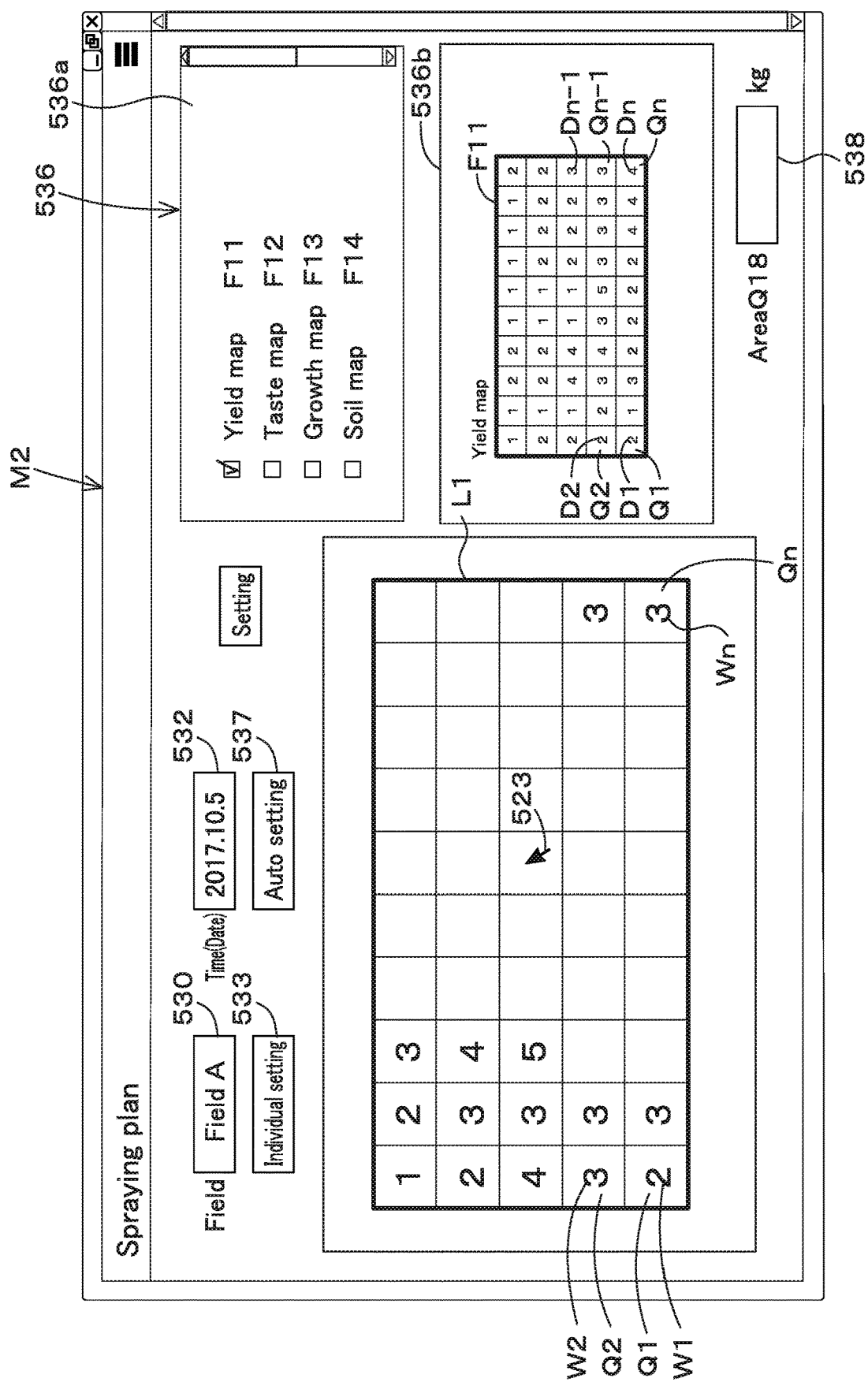
FIG. 13 is a view illustrating one example of the plan screen M2 displaying a data selector portion according to the embodiment.

In addition, when the cooperation setting button 535 displayed on the plan screen M2 is selected, it is possible to set the spraying amount Wn for each area Qn based on data such as agricultural map data. In particular, when the linkage setting button 535 is selected, the plan creator portion 502 displays the data selector portion 536 on the plan screen M2 as shown in FIG. 13. The data selector portion 536 includes a map selector portion 536a that selects one agricultural map data from among a plurality of agricultural map data, and includes a map display portion 536b that displays the agricultural map data selected by the map selector portion 536a.

Figure 20:
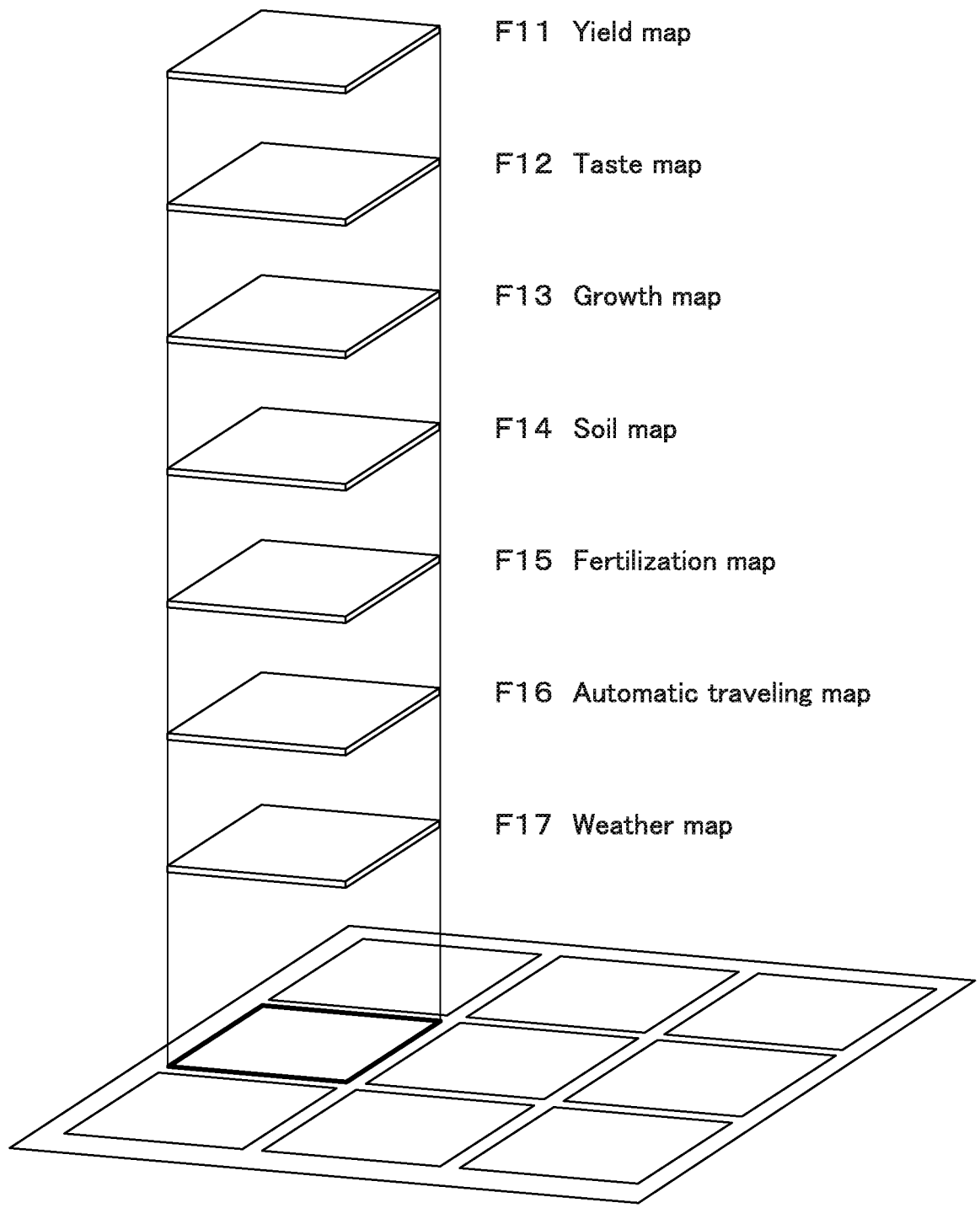
FIG. 20 is a view illustrating a plurality of agricultural maps according to the embodiment.

As shown in FIG. 20, the agricultural map data includes a yield map F11 that visualizes yield data, a taste map F12 that visualizes taste data, a growth map F13 that visualizes growth data, a soil map F14 that visualizes soil data, and a fertilization map F15 visualizing fertilization data, an automatic traveling map F16, a weather map F17, and the like.

For example, in each of the yield map F11, the taste map F12, the growth map F13, the soil map F14, the fertilization map F15, the automatic traveling map F16, and the weather map F17, the data at predetermined positions are associated with each other. In other words, the yield map F11, the taste map F12, the growth map F13, the soil map F14, the fertilization map F15, the automatic traveling map F16, and the weather map F17 are layer maps in which data are layered. The data of the yield map F11, the taste map F12, the growth map F13, the soil map F14, the fertilization map F15, the automatic traveling map F16, and the weather map F17 are measured by various machines in advance.

The yield map F11 includes data indicating the relation between the area Qn of the field and the yield in the area Qn, and is data that is measured by the harvester when the crop is harvested by the harvester. The taste map F12 includes data indicating the relation between the area Qn of the field and the protein content in the area Qn, and is data measured by the harvester when the crop is harvested by the harvester. The growth map F13 includes data indicating the relation between the area Qn of the field and the growth of the crop in the area Qn. and is data that is obtained by imaging a planted field from above and analyzing the shot image with growth indexes such as the DVI, RVI, NDVI, GNDVI, SAVI, TSAVI, CAI, MTCI, REP, PRI, and RSI. The soil map F14 is data indicating the area Qn of the field, soil components, soil hardness, and the like, and is data detected by the hardness detection device. The fertilization map F15 includes data indicating the relation between the area Qn of the field and the fertilizer supplying amount (dispersion amount Wn) in the area Qn, and is measured by the application device 3 when the fertilizer is applied by the application device 3.

The automatic traveling map F16 includes data obtained when a working machine such as a tractor is automatically traveled, and is data including a scheduled traveling route (scheduled traveling path) for performing the automatic traveling and the traveling locus (position information obtained by the position detector device 220) of the working machine that has actually traveled.

The data of the automatic traveling map F16 is not limited to the example described above, and may be any data as long as the working machine is automatically traveled.

The weather map F17 includes data on weather conditions, and includes wind direction, wind speed, temperature, humidity, sunny, cloudy, rain, thunder, snow, rainfall, snowfall, probability of precipitation, atmospheric pressure, and the like in a predetermined area. The data of the weather map F17 can be obtained by connecting to a weather server or the like that provides information on weather.

The data of the yield map F11, the taste map F12, the growth map F13, the soil map F14, and the fertilization map F15 described above were data in units of area Qn of the field, but may be data in units of position information (latitude, longitude).

As shown in FIG. 14, the storage device 503 stores agricultural map data (yield map F11, taste map F12, growth map F13, soil map F14, fertilization map F15, automatic traveling map F16, weather map F17, and the like) for each field. The storage of the agricultural map data in the storage device 503 can be performed, for example, by transmitting the agricultural map data to the support device 500 through the external terminal 510 after the agricultural work is completed. The method of transmitting agricultural map data to the support device 500 and the storage of agricultural map data in the storage device 503 are not limited to the examples described above.

When the predetermined agricultural map data is selected from the plurality of agricultural map data in the map selector portion 536a, the plan creator portion 502 displays the selected agricultural map data in the map display portion 536b as shown in FIG. 13. For example, when the data of the yield map F11 is selected by the map selector portion 536a, the plan creator portion 502 refers to the storage device 503 and extracts the data of the yield map F11.

The plan creator portion 502 partitions the field of the map display portion 536b into a plurality of areas Qn (n=1, 2, 3, . . . , N), and sets, as a representative value Dn (n=1, 2, 3, . . . , N), a plurality of data Dn (n: sections, Dn: data), that is, an average value obtained by averaging the harvested amount for each section to enter each of the partitioned areas Qn in the data of the yield map F11. Alternatively, the plan creator portion 502 sets, as the representative value Dn, an integrated value obtained by integrating a plurality of data Dn in each of the partitioned areas Qn in the data of the yield map F11. Alternatively, the plan creator portion 502 sets, as the representative value Dn, the numerical value per area obtained by dividing the average value and the integrated value by as area of the area Qn.

After obtaining the representative value Dn, the plan creator portion 502 allocates the representative value Dn to one of a plurality of groups (a plurality of ranks) according to the size (value) of the representative value Dn, and changes the color or the like for each rank, thereby displaying the yield map F11. That is, the plan creator portion 502 divides the field indicating the field or the like into a plurality of fields, and displays the mesh-type yield map F11 in which the data of the yield map F11 is assigned to the area Qn. In addition, in the above-described embodiment, the visualization of the yield map F11 with a mesh type map is illustrated, but the visualized map of the yield map F11 is not limited to the above-described example.

When the individual setting button 533 is selected after displaying the yield map F11 on the map display portion 536b, the plan creator portion 502 displays the spraying input portion 538 as in FIG. 11. By inputting the spraying amount to the spraying input portion 538, the spraying amount Wn for each area can be set. That is, as shown in FIG. 13, in setting the spraying amount Wn for each area Qn, the plan creator portion 502 displays the yield map F11 in the same field in which the spraying amount Wn is set on the planning screen M2, and can set the spraying amount Wn while watching the yield map F11.

In addition, although the yield map F11 has been described as an example in the above-described embodiment, the map display on the planning screen M2 may be any one of the taste map F12, the growth map F13, the soil map F14, the fertilization map F15, the automatic traveling map F16, and the weather map F17.

In addition, as shown in FIG. 13, after the agricultural map such as the yield map F11 is displayed on the map display portion 536b, the automatic setting button 537 may be displayed on the plan screen M2. When the automatic setting button 537 is selected, the supplying amount Wn of the area Qn is automatically set corresponding to the data Dn of the area Qn in the agricultural map displayed on the map display portion 536b. The plan creator portion 502 determines the supplying amount Wn based on the relation between the data Dn and the supplying amount Wn. For example, when the data Dn is the "growth map F13", when the value of the data Dn is small, that is, when the growth of the crop is delayed, the plan creator portion 502 sets the data so that the growth of the crop is promoted. The spraying amount Wn is set to a large value in accordance with the value of data Dn. On the other hand, when the data Dn is the "growth map F13" and the value of the data Dn is large (when the growth of the crop is advanced), the plan creator portion 502 does not allow the growth of the crop to be promoted too much. In addition, the spraying amount Wn is set to be small in accordance with the value of the data Dn.

As described above, even when the supplying amount Wn for each area Qn is set in cooperation with the data such as the agricultural map, the plan creator portion 502 causes the storage device 503 to store, as the spraying plan, the spraying information including the supplying amount Wn for each area Qn, the field identification information, and the time information.

The spraying support system for the working machine is provided with a plan obtainer device. The plan obtainer device is provided in the working machine 1 (the tractor 2, the sprayer device 3). The support device 500 is a device for obtaining the spraying plan created by the plan creator portion 502. The plan obtainer device is, for example, either the communicator device 210 provided in the tractor 2 or the external interface 215 provided in the tractor 2. The external interface 215 is a connection terminal for connecting an electronic storage medium such as a USB memory or an SD card. The working machine 1 may have both the communicator device 210 and the external interface 215.

In the case where the plan obtainer device is the communicator device 210, the support device 500 transmits the spraying plan stored in the storage device 503 to the communicator device 210 (the tractor 2) when the communicator device 210 makes a request for a spraying plan to the support device 500 after the communicator device 210 connects to the support device 500. In particular, the support device 500 transmits, to the communicator device 210, the spraying plan including the spraying amount Wn for each area Qn, the field identification information, and the time information.

Note that the support device 500 may transmit, to the communicator device 210, the field position information corresponding to the field identification information. In addition, the support device 500 may transmit, to the communicator device 210, information indicating the contour L1 of the field corresponding to the field identification information, that is, map information. When the position information of the designated point IP1 is used as the field position information, the position information of the designated point IP1 may be treated as information shared with both the field position information and the map information.

When the plan obtainer device is the external interface 215, the tractor 2 acquires the spraying plan through the external terminal 510. For example, after the external terminal 510 connects to the support device 500, when the external terminal 510 requests the support device 500 for a spraying plan, the support device 500 outputs the spraying plan stored in the storage device 503 to the external terminal 510. In particular, the support device 500 transmits, to the external terminal 510, the spraying plan including the spraying information including the supplying amount Wn for each area Qn, the field identification information, and the time information. When transmitting the spraying plan, the support device 500 may transmit, to the external terminal 510, the field position information and/or the map information corresponding to the field identification information, as in the above-described embodiment.

When the electronic storage medium is connected to the external terminal 510, the external terminal 510 transfers, to the electronic storage medium, the information transmitted from the support device 500. When the spraying plan is stored in the electronic storage medium and then connected to the external interface 215, the spraying plan stored in the electronic storage medium is transferred to the external interface 215 (the tractor 2). Thus, when the plan obtainer device is the external interface 215, the tractor 2 can indirectly acquire information such as the spraying plan from the support device 500.

The information acquired by the plan obtainer device (the communicator device 210, the external interface 215) is stored in the storage device (storage portion) 240 provided in the working machine 1. The storage device 240 is a non-volatile memory or the like, and is connected to the plan obtainer device (the communicator device 210, the external interface 215). The storage device 240 stores the information acquired by the plan obtainer device, that is, the spraying plan (spraying information including the spraying amount Wn for each area Qn, field identification information, time information), field position information, and map information.

Figure 15:
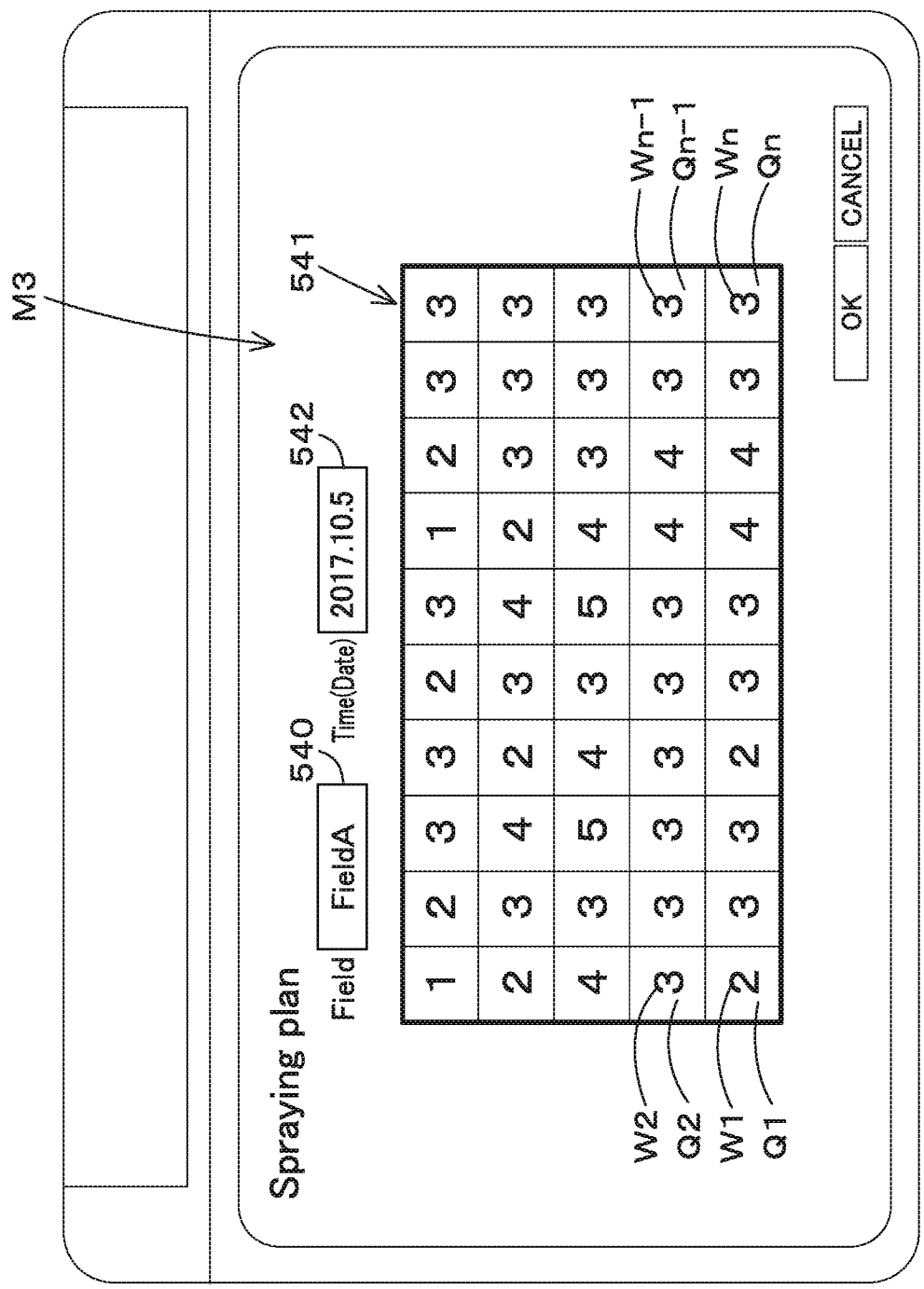
FIG. 15 is a view illustrating one example of a plan display screen M3 according to the embodiment.

The display device 230 can display the spraying plan. For example, when a worker or the like performs a predetermined operation on the display device 230, a plan display screen M3 for displaying a spraying plan is displayed as shown in FIG. 15. The plan display screen M3 includes an agricultural field selector portion 540, an agricultural field display portion 541, and a time setting portion 542. The agricultural field selector portion 540 can display the agricultural field identification information stored in the storage device 240 and select a predetermined agricultural field identification information from the displayed plurality of agricultural field identification information. The time setting portion 542 is a portion that can set the time. The agricultural field display portion 541 displays the spraying information (spraying amount Wn for each area Qn) corresponding to the time corresponding to the time setting portion 542 among the agricultural field identification information selected by the agricultural field selector portion 540. By changing the field identification information selected by the field selector portion 540 and the time set by the time setting portion 542, the spraying information displayed on the field display portion 541 can be changed. Thus, as shown in FIG. 15, the worker sets the field for the spraying work on the plan display screen M3 with the field selector portion 540 and sets the time for performing the spraying work with the time setting portion 542. The corresponding spraying plan can be displayed on the display device 230.

The spraying support system for a working machine includes a spraying controller device. The spraying controller device controls the spraying portions (the first sprayer portion 321 and the second sprayer portion 322) of the sprayer device 3 based on the spraying information of the spraying plan acquired by the plan obtainer device (the communicator device 210, the external interface 215). For example, the spraying controller device is one of the controller device 550 provided in the spray device 3 and the controller device 202 provided in the traveling vehicle 2. The controller device 550 and the controller device 202 may be integrated to form a spraying controller device. In this embodiment, the description will proceed assuming that the spraying controller device is the controller device 550.

The controller device 550 controls the rotation of the first rotor 410 of the first spraying portion 321 and the rotation of the second rotor 420 of the second spraying portion 322. In other words, the controller device 550 is connected to the inverter 22, and the rotating speed of the first motor 231 (first driving source 48A) that applies rotational power to the first rotor 410 and the second rotor 420. The number of rotations of the second motor 232 (the third driving source 48C) that applies rotational power is controlled.

Figure 16A:
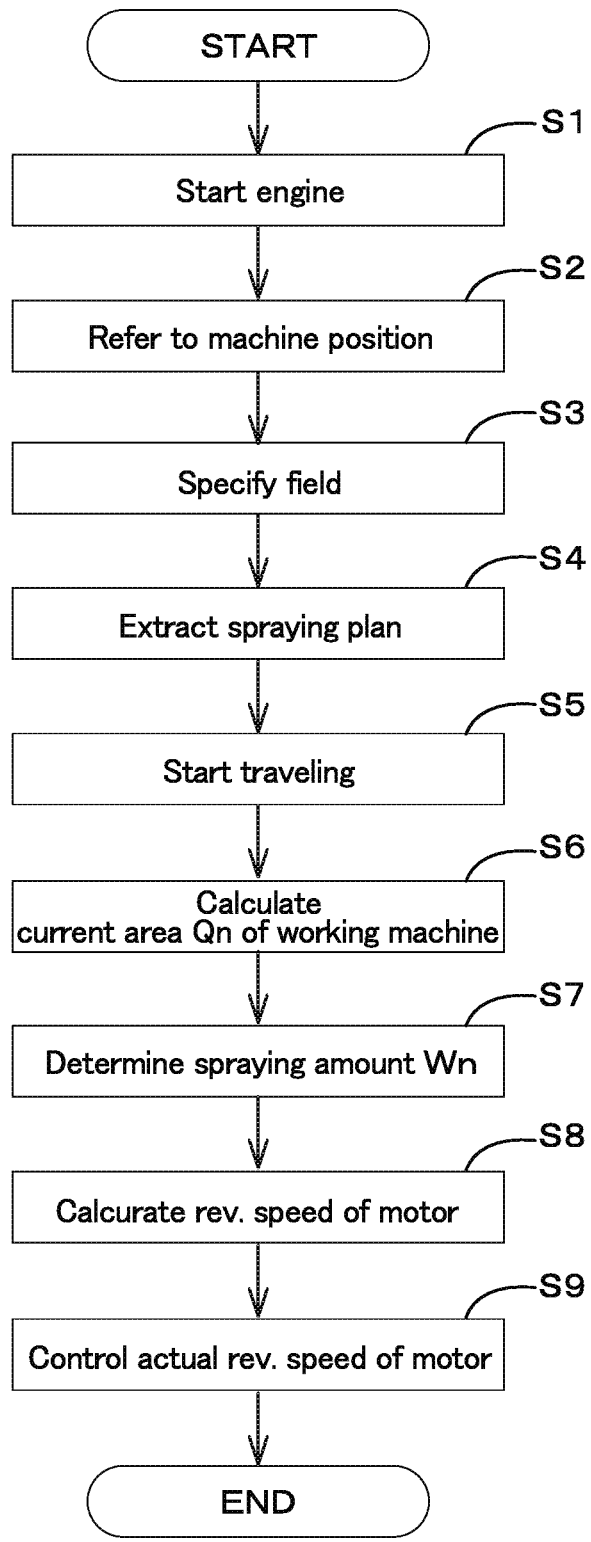
FIG. 16A is a view illustrating a control flow of a controller device that performs a spray work after automatically determining a field according to the embodiment.

FIG. 16A is a diagram showing a control flow of the controller device 550. FIG. 16A shows an example in which the spraying work is advanced after the controller device 550 automatically determines the field to be sprayed.

For example, as shown in FIG. 16A, after the worker has moved the tractor 1 or the like to the field for spraying work, when the engine 11 is started (step S1), the controller device 550 is detected by the position detector device 220. The position (machine position) of the working machine 1 (the tractor 2, the sprayer device 3) is referred to (step S2). In addition, the controller device 550 identifies the field where the working machine 1 is located based on the machine position (step S3). In particular, the controller device 550 refers to the storage device 240 to extract the specific field position information including the machine position from the field position information and to search the field identification information corresponding to the extracted specific field position information. Thereby, the field in which the working machine 1 is located, that is, the field in which the spraying work is performed (field to be sprayed) is specified.

After specifying the field, the controller device 550 refers to the storage device 240 and extracts the spraying plan in the specified field (step S4). That is, the controller device 550 extracts at least the supplying amount Wn for each area Qn included in the spraying plan.

When the tractor 2 starts traveling after extracting the spraying plan in the specified field (step S5), the controller device 550 refers to the spraying plan and calculates the area Qn that matches the machine position detected by the position detector device 220 (step S6). That is, the controller device 550 obtains the area Qn where the working machine 1 is located among the plurality of areas Qn shown in the spraying plan based on the machine position.

The controller device 550 determines the spraying amount Wn corresponding to the area Qn after the calculation of the area Qn (step S7). The controller 550 respectively calculates the rotating speed of the first motor 231 and the rotating speed of the second motor 232 based on the spraying amount Wn (S8). In other words, the controller device 550 calculates the respective rotating speeds of the first rotation body 410 and the second rotation body 420 based on the spraying amount Wn.

The controller device 550 outputs a control signal to the inverter 22 so that the rotating speed of the first motor 231 and the rotating speed (an actual rotating speed) of the second motor 232 match the calculated rotating speed (calculated rotating speed), and thereby the controller device controls the rotating speed of the first motor 231 and the rotating speed of the second motor 232 (step S9). The controller device 550 repeats the above-described processing of step S6 to step S9 until the spraying work in all areas Qn is completed, for example.

Figure 16B:
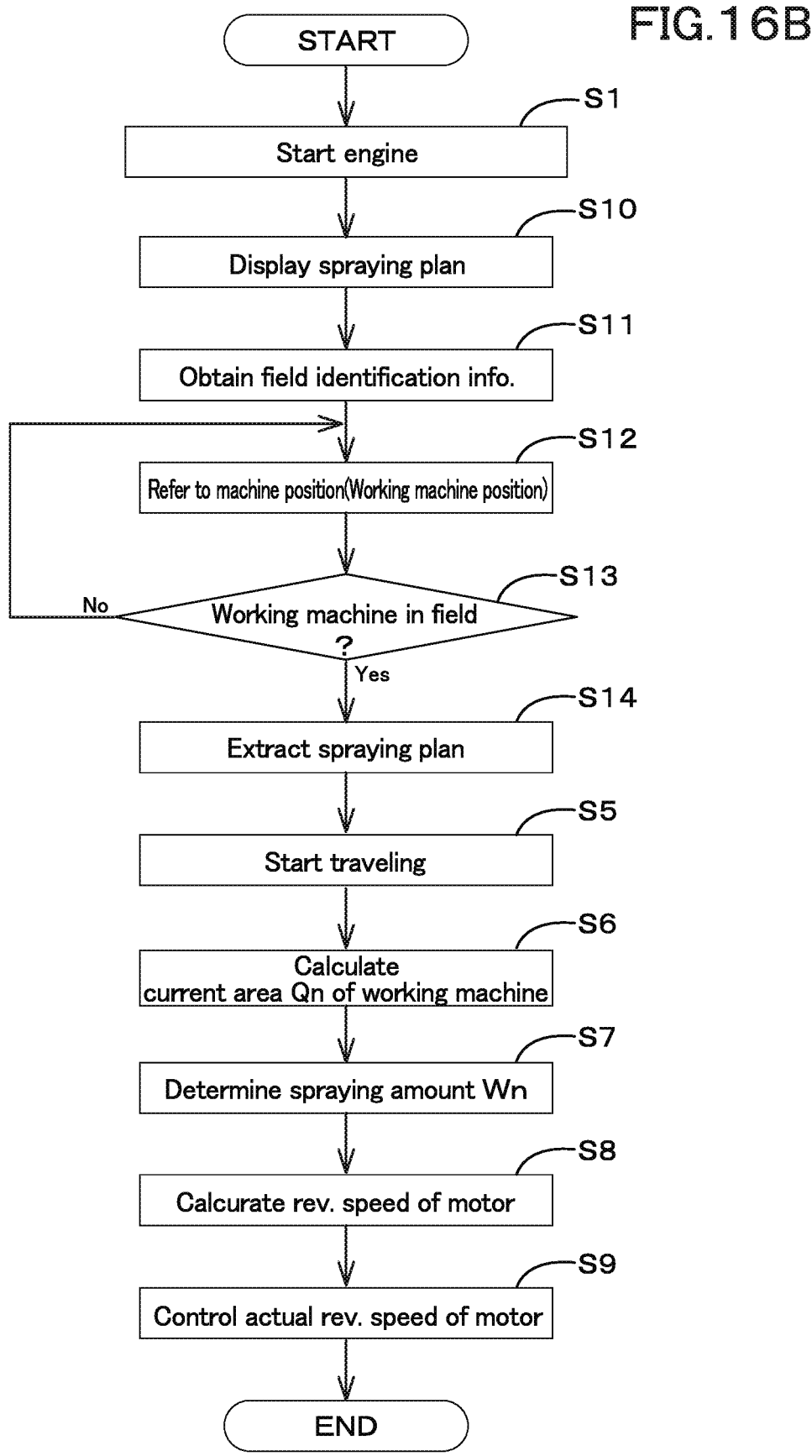
FIG. 16B is a view illustrating a control flow of the controller device that performs the spray work after manually determining a field according to the embodiment.

FIG. 16B is a diagram showing a control flow of controller device 550. FIG. 16B shows an example in which the field to be sprayed is manually determined and the spraying work is advanced.

As shown in FIG. 16B, after the engine 11 is started (after step S1), when the operator operates the display device 230 to display the spraying plan on the display device 230 (step S10), the controller device 550 obtains the field identification information displayed on the display device 230 from the display device 230 (step S11). The controller device 550 refers to the machine position detected by the position detector device 220 (step S12), and judges whether or not the working machine 1 is located in the field indicated by the display device 230 (step S13).

When the working machine 1 is located in the field indicated by the display device 230, the controller device 550 extracts the spraying plan in the field (step S14). After extracting the spraying plan, the controller device 550 executes the processes of step S5 to step S9 as in FIG. 16A. Accordingly, it is possible to perform the spraying work based on the spraying plan (the agricultural field, the time, the spraying amount) displayed on the display device 230.

As described above, as shown in FIG. 16A and FIG. 16B, according to the controller device 550, the sprayer device 3 can perform the spraying using the spraying plan. That is, the sprayer device 3 can be operated in cooperation with the spraying plan.

In the above-described embodiment, the number of revolving of the first motor 231 (the number of revolving of the first rotor 410) and the number of revolving of the second motor 232 (the number of revolving of the second rotor 420) are changed according to the spraying amount Wn in the area Qn. However, the revolving speed of the first motor 231 (the rotating speed of the first rotor 410) and the revolving speed of the second motor 232 (the rotating speed of the second rotor 420) may be changed based on the field contour L1.

Figure 16C:
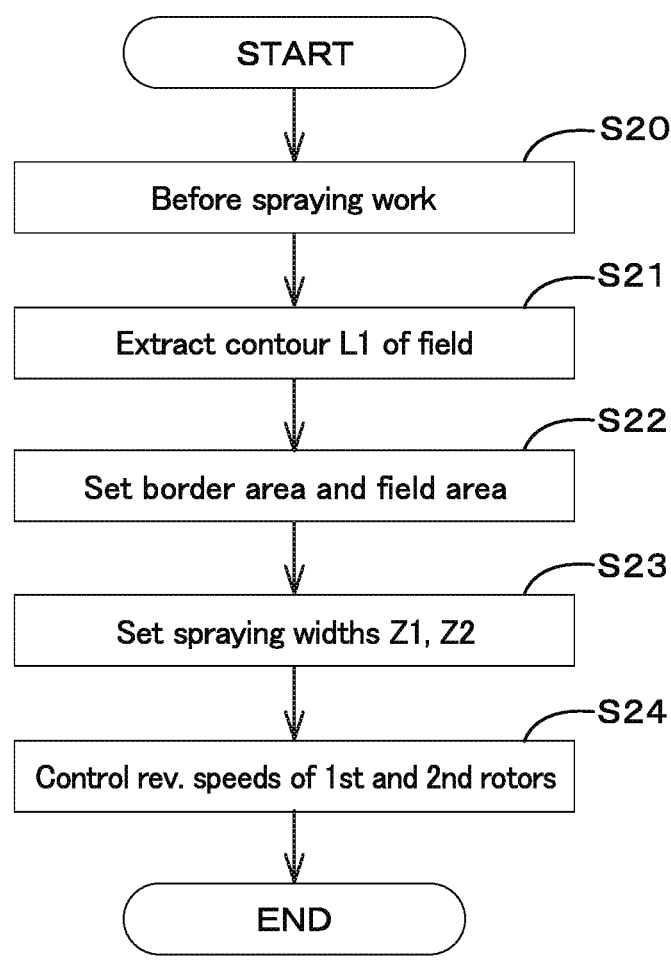
FIG. 16C is a view illustrating a control flow of the controller device in consideration of a contour L1 of the field according to the embodiment.

FIG. 16C is a diagram showing a control flow of the controller device 550 when the contour L1 of the field is taken into consideration. In FIG. 16C, description will be given on the assumption that the identification of the agricultural field and the extraction of the supplying amount Wn of the area Qn have been completed as shown in FIGS. 16A and 16B.

As shown in FIG. 16C, the controller device 550 refers to the map information stored in the storage device 240 before the start of the spraying work (step S20) and extracts the contour L1 of the field in which the spraying work is performed (step S21). For example, the controller device 550 extracts the position information of the designated point IP1 indicating the contour L1 of the field.

Figure 17:
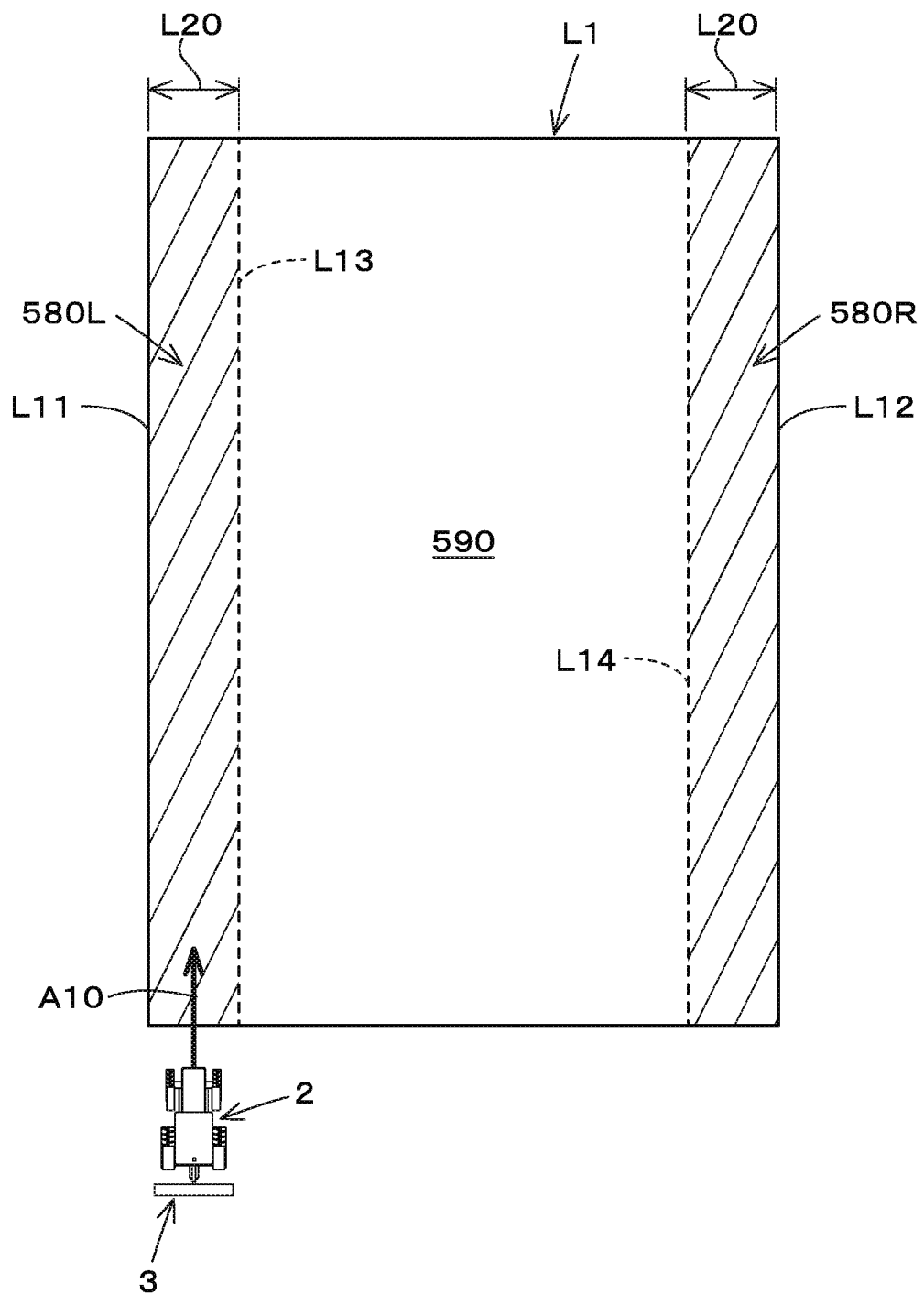
FIG. 17 is an explanation view in which a spraying area is set to both a border area and a field area according to the embodiment.

After extracting the contour L1 of the field (after step S21), the controller device 550 sets the spray area for spraying the sprayed object to the border area 580 near the contour of the field and to a field area 590 different from and the border area 580 as shown in FIG. 17 (step S22). The spray area is an area surrounded by the contour L1 of the field.

In the spraying operation, when the traveling direction of the working machine 1 is the arrowed line A10 direction and is substantially parallel to the first side L11 and the second side L12 of the field contour L1, the controller device 550 sets lines that are arranged inside of the field by a predetermined distance L20 from the first side L11 and the second side L12 substantially parallel to the traveling direction A10 as virtual lines L13 and L14. The controller device 550 sets an area surrounded by the virtual line L13 and the contour L1 as a border area 580L, and sets an area surrounded by the virtual line L14 and the contour L1 as a border area 580R. In addition, the controller device 550 sets a area other than the border areas 580L and 580R as the field area 590 within the field contour L1.

After determining the border area 580 and the field area 590, the controller device 550 sets the spraying widths Z1 and Z2 according to the border area 580 and the field area 590 (step S23). The controller device 550 sets the spraying width Z1 of the sprayer device 3 in the border areas 580L and 580R and the spraying width Z2 of the sprayer device 3 in the field area 590 to be different from each other. After setting the spraying widths Z1 and Z2, the controller device 550 controls the rotational speeds of the first rotor 410 and the second rotor 420 so that the set spraying widths Z1 and Z2 are achieved (step S24).

Figure 18A:
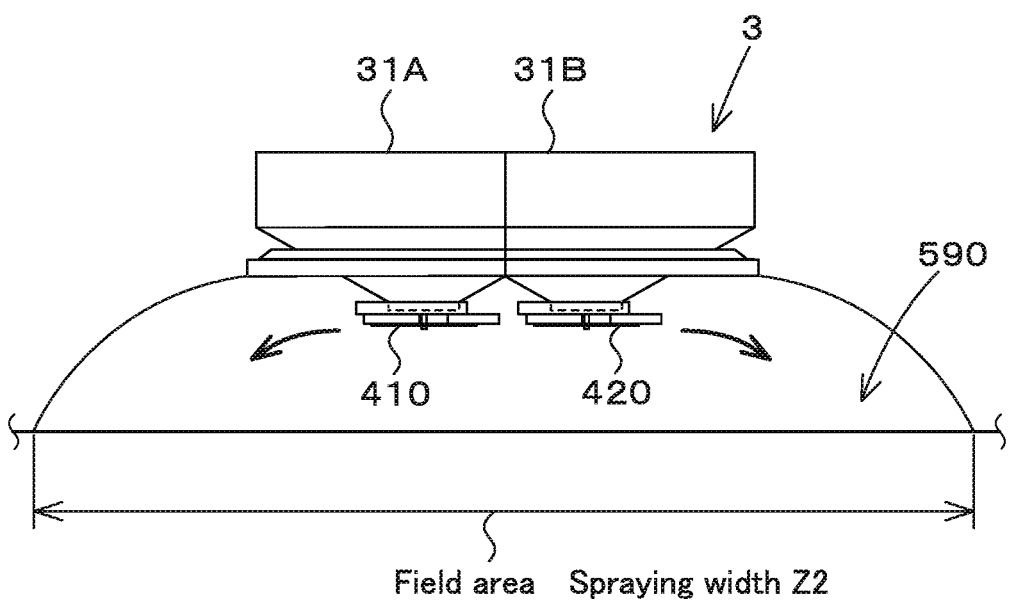
FIG. 18A is a view illustrating a state where the working machine is located in the field area according to the embodiment.

As shown in FIG. 18A, when the working machine 1 (the tractor 2, the sprayer device 3) is located in the field area 590, the controller device 550 sets the rotating speeds of the first rotor 410 and the second rotor 420 to be the same. In this manner, the spraying width of the sprayer device 3 is set to the spraying width Z2.

Figure 18B:
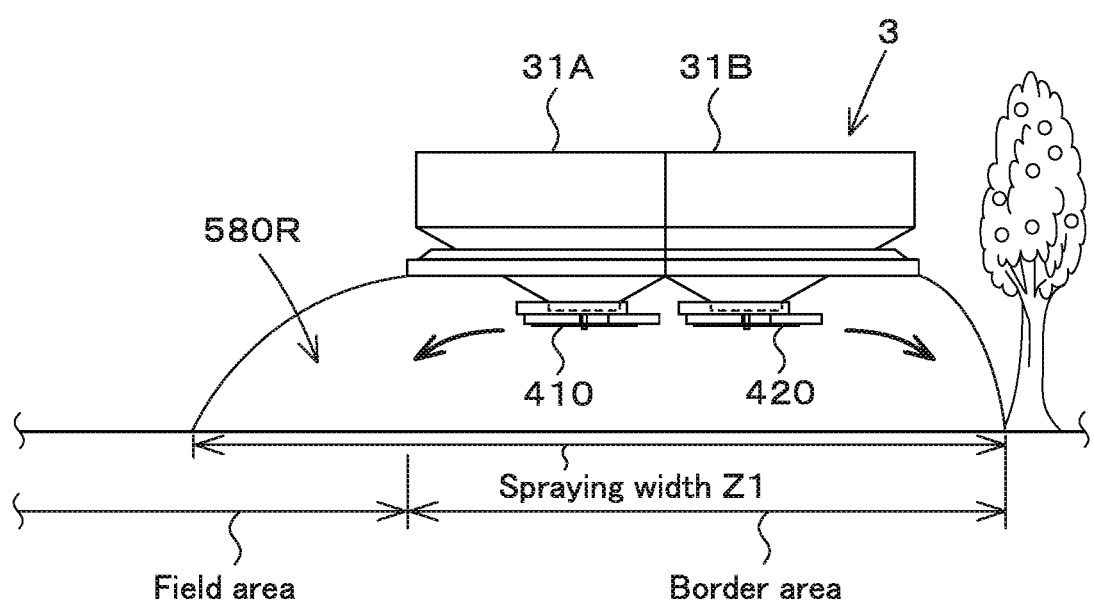
FIG. 18B is a view illustrating a state where the working machine is located in the border area close to the right according to the embodiment.

As shown in FIG. 18B, when the working machine 1 is located in the border area 580R, the controller device 550 determines that the rotating speed of the first rotor 410 on the side far from the field contour L1 is the same as the rotating speed in the field area 590. On the other hand, when the working machine 1 is located in the border area 580R, the controller device 550 sets the rotating speed of the second rotor 420 on the side close to the field contour L1 to be smaller than the rotating speed of the first rotor 410 on the side far from the field contour L1, thereby setting the spraying width of the sprayer device 3 to the spraying width Z1. That is, in the border area 580R, the spraying width of the second rotor 420 is smaller than the spraying width of the first rotor 410.

Figure 18C:
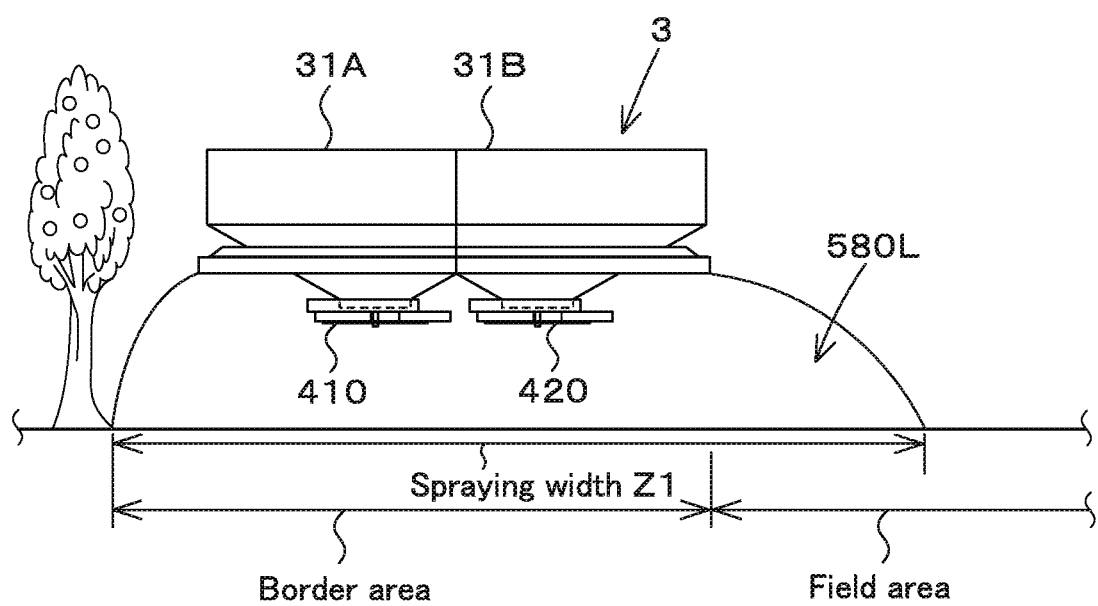
FIG. 18C is a view illustrating a state where the working machine is located in the border area close to the left according to the embodiment.

As shown in FIG. 18C, when the working machine 1 is located in the border area 580L, the controller device 550 determines that the rotating speed of the second rotor 420 on the side far from the field contour L1 is the same as that in the field area 590. By setting the rotating speed of the first rotor 410 on the side closer to the field contour L1 to be smaller than that of the second rotor 420 on the side far from the field contour L1, the spraying width Z1 is obtained. That is, in the border area 580L, the spraying width of the first rotor 410 is smaller than the spraying width of the second rotor 420.

That is, when the working machine 1 is located in the border area 580R, at least the rotation of the rotating body (the first rotor 410, the second rotor 420) closer to the field contour L1 is reduced to reduce the rotation of the border area 580R. The spraying width Z1 in the field area 590 and the spraying width Z2 in the field area 590 are controlled.

As described above, when the controller device 550 changes the rotating speeds of the first rotor 410 and the second rotor 420, the rotating speed of the PTO shaft 19 is set in both the border area 580 and the field area 590. Without changing the rotating speed of the PTO shaft 19, the rotating speed of either the first motor 231 or the second motor 232 is changed while keeping the rotating speed of the PTO shaft 19 constant.

The spraying support system for a working machine, comprising: the support device 500 to create a spraying plan representing a relation between field information relating to a field to which spray substance is sprayed and spraying information including spraying amount of the spray substance; the plan obtainer device 210, 215 provided to the working machine having a sprayer device 3 to spray the spray substance and configured to obtain the spraying plan created by the plan creator portion 502; and the spraying controller device 202, 550 to control the sprayer portion 32 of the sprayer device 3 based on the spraying information of the spraying plan obtained by the plan obtainer device 210, 215. According to this configuration, the plan creator portion 502 can create a spraying plan showing the spraying amount corresponding to the field. In addition, the working machine 1 can acquire the spraying plan created by the plan creator portion 502 by the plan obtainer portions 210 and 215. By the spraying controller devices 202 and 550, the spraying work can be easily performed based on the spraying information included in the spraying plan.

The spraying support system for the working machine 1, comprising: the field register portion 501 to register, as the field information, field position information representing a position of the field; and the position detector device 220 to detect a machine position showing a position of the working machine. The spraying controller device 202, 550 specifies a field to which the sprayer device 3 sprays the spray substance based on the field position information and on the machine position detected by the position detector device 220, and controls the sprayer portion 32 based on the spraying information of the specified field. For example, it is possible to specify the field where the spraying work is performed simply by detecting the machine position, which is the position of the working machine 1. After specifying the field, the spraying controller devices 202 and 550 can easily perform the spraying work based on the spraying plan.

The spraying support system for the working machine 1, comprising: the field register portion 501 to register, as the field information, field identifier information for identifying the field and field position information representing a position of the field identified based on the field identifier information; and the position detector device 220 to detect a machine position showing a position of the working machine 1. The spraying controller device 202, 550 specifies a field to which the sprayer device 3 sprays the spray substance based on the field position information, on the field identifier information and on the machine position detected by the position detector device 220, and controls the sprayer portion 32 based on the spraying information of the specified field. For example, it is possible to specify the field to perform the spraying work by using both the field identification information indicating the field and the machine position. After specifying the field, the spraying controller devices 202 and 550 can easily perform the spraying work based on the spraying plan.

The field register portion 501 registers, as the field information, map information including a contour of the field, and the spraying controller device 202, 550 controls the sprayer portion 32 based on the contour represented in the map information. According to this, when the contour of the field is registered, the spraying work can be easily performed in consideration of the contour of the field.

The sprayer portion 32 has a rotor 410, 420 to spray the spray substance, and the spraying controller device 202, 550 controls a rotating speed of the rotor 410, 420. According to this configuration, the spraying amount, that is, the spraying width can be easily changed only by changing the number of rotations of the rotors 410 and 420.

The spraying controller device 202, 550 sets a spraying area to which the spray substance is sprayed to both a border area close to the contour of the field and a field area different from the border area in the field represented in the spraying plan, and the spraying controller device 202, 550 differs a spraying width in the border area from a spraying width in the field area. According to this configuration, it is possible to perform the spraying work properly and in a well-balanced manner on a position near the contour of the field (close to the boundary of the field) and on a position away from the boundary of the field.

The sprayer portion 32 has a rotor 410, 420 to spray the spray substance, and the spraying controller device 202, 550 reduces a rotating speed of the rotor 410, 420 in the border area to be smaller than a rotating speed of the rotor 410, 420 in the field area. According to this configuration, it is possible to reduce the spraying width of the spray substance in the border area 580 while ensuring the spraying width of the spray substance in the field area 590.

The sprayer portion 32 has a plurality of rotors 410, 420 to spray the spray substance, and the spraying controller device 202, 550 reduces rotating speeds of the rotors 410, 420 located close to the contour to be smaller than rotating speeds of the rotors 410, 420 located far from the contour L1 in the border area. According to this configuration, in the border area 580, the spraying work can be performed without reducing the spraying amount on the side far from the contour L1 of the field.

The spraying controller device 202, 550 increases rotating speeds of the rotors 410, 420 located in the field area to be larger than rotating speeds of the rotors 410, 420 located in the border area. According to this configuration, it is possible to secure the spraying amount of the field area 590 without the influence of the border area 580.

Figure 19A:
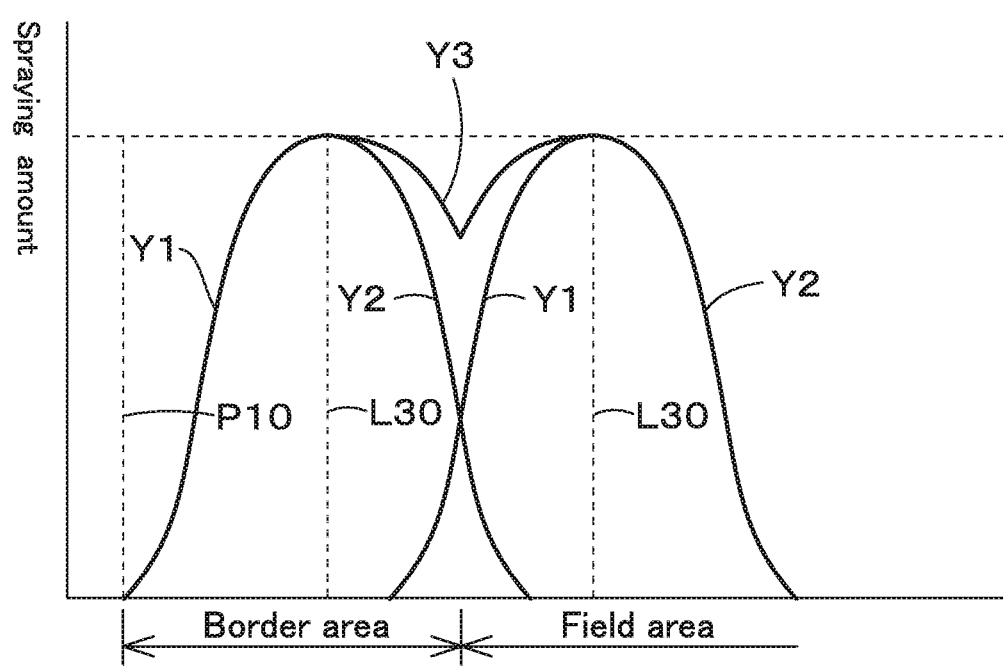
FIG. 19A is a view illustrating a state where spraying is performed without reducing rotating speeds of a first rotor and a second rotor in a case where the working machine is located in the border area close to a contour of the field according to the embodiment.
Figure 19B:
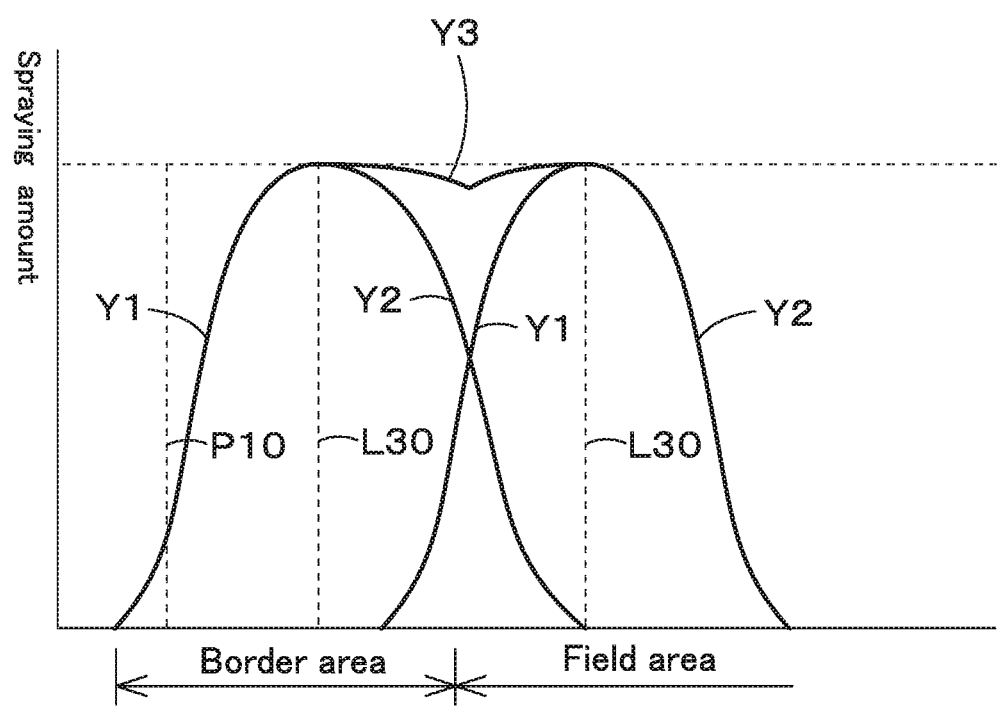
FIG. 19B is a view illustrating a state where the spraying is performed with the rotating speed of the first rotor reduced and the rotating speed of the second rotor kept same as that in the field area in a case where the working machine is located in the border area close to a contour of the field according to the embodiment.

FIG. 19A and FIG. 19B show a comparison of the supplying amount when the spraying work is performed in an area (border area) near the contour L1 of the field. In FIG. 19A and FIG. 19B, the line L30 indicates the center portion in the width direction of the sprayer device 3. The left side of the width direction central portion L30 shows the spraying amount Y1 by the first rotor 410, and the right side of the width direction central portion L30 shows the spraying amount Y2 by the second rotor 420. In FIG. 19A and FIG. 19B, the position P10 shows the position of the contour L1 of the field.

FIG. 19A is a result of reducing the rotations of both the first rotor 410 and the second rotor 420 when the working machine 1 is in an area (a border area) near the contour L1 (boundary) of the field. FIG. 19B shows the result when the rotation of the first rotor 410 is reduced and the rotation of the second rotor 420 is the same as that in the field area when the rotation area of the field is close to the boundary (the border area). As shown in FIG. 19A, when the rotating of both the first rotor 410 and the second rotor 420 are reduced, the spraying amount Y3 is lowered as a whole. On the other hand, as shown in FIG. 19B, since the rotating of the second rotor 420 in the border area is not lowered, the spraying amount Y2 in the second rotor 420 is larger than that in FIG. 19A. In other words, in the border area, the rotating speed of the second rotor 420 on the side far from the field boundary is set to be the same as that in the field area, so that it is possible to suppress a decrease in the total spraying amount in the border area.

The working machine 1 has: the prime mover 11; and the PTO shaft 19 to be rotated by the prime mover 11. The sprayer device 3 includes: the motor 23; and the power transmission mechanism to transmit powers of the PTO shaft 19 and the motor 23 to the rotor 410, 420, and the spraying controller device 202, 550 changes a rotating speed of the motor 23 with a rotating speed of the PTO shaft 19 kept constant in controlling the sprayer portion 32. According to this configuration, when the rotors 410 and 420 are rotated by both the power of the PTO shaft 18 and the power of the motor 23, the spraying width can be accurately changed by changing the rotating speed of only the motor 23.

The working machine 1 includes the traveling vehicle 2 to tow the sprayer device 3, and the traveling vehicle 2 has the display device 230 to display the spraying plan. According to this configuration, the operator can perform the spraying work while easily confirming the spraying plan by watching the display device 230.

In the above-described embodiment, the traveling vehicle 2 is provided with the display device 230. However, the sprayer device 3 may have the display device 230 to display the spraying plan. Even when the display device 230 is provided in the sprayer device 3, the display device 230 can display the spraying plan, as in the case where the display device 230 is provided in the traveling vehicle 2.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modified examples within and equivalent to a scope of the claims.

What is claimed is:

1. A spraying support system for a working machine, comprising:
   a server, including at least a processor and memory, configured to:
     create, for respective fields in which a spray substance is sprayed, spraying plans each representing a relation between field information relating to a corresponding one of the fields and spraying information including spraying amount of the spray substance,
     register, as the field information, field identifier information for identifying the corresponding one of the fields and field position information representing a position of the corresponding one of the fields identified based on the field identifier information, and
     store the spraying plans;
   a plan obtainer, including either a communicator configured to perform wireless communication with the server, or a connection terminal configured to receive an electronic storage medium, provided to the working machine having a sprayer configured to spray the spray substance, and configured to obtain the spraying plans created by the server;
a first storage, including a memory, and configured to store the spraying plans obtained by the plan obtainer, the first storage being provided in the working machine,
a spraying controller, including at least a processor, configured to control a sprayer portion of the sprayer based on the spraying information of any one of the spraying plans obtained by the plan obtainer, the spraying controller being provided in the working machine; and
a position detector, including at least a receiver configured to receive satellite positioning data, configured to detect a machine position showing a position of the working machine,
wherein the plan obtainer is further configured to obtain the spraying plans from the server and store the spraying plans in the first storage,
wherein the spraying controller is further configured to identify, based on the machine position, on the field position information, and the field identifier information included in the field information represented in the spraying plans stored in the server, a field to be sprayed which is one of the fields and in which the working machine is located, and extracts, from the server, a spraying plan which is one of the spraying plans that corresponds to the field to be sprayed based on the machine position, the field position information, and the field identifier information, and
wherein when the working machine starts traveling, the spraying controller is further configured to control, based on the field information and the spraying amount included in the spraying information represented in the extracted spraying plan and on the machine position, the sprayer portion to spray the spray substance in the field to be sprayed.

2. The spraying support system according to claim 1,
wherein the spraying controller is further configured to control the sprayer portion based on a contour of the field to be sprayed, the contour of the field to be sprayed having been included by the server in the field information represented in the extracted spraying plan.

3. The spraying support system according to claim 2,
wherein the spraying controller is further configured to, in a spraying area surrounded by the contour of the field to be sprayed represented in the extracted spraying plan,
set one or more virtual lines each of which is at a predetermined distance inward from a corresponding one of sides of the contour of the field to be sprayed, the sides being parallel to a direction of travel of the working machine, and set, as one or more border areas, one or more areas each between a corresponding one of the one or more virtual lines and a corresponding one of the sides, and
set, as a field area, an area other than the one or more border areas, and perform control such that a spraying width of the sprayer device differs between the one or more border areas and the field area.

4. The spraying support system according to claim 3,
wherein the sprayer portion has a rotor to spray the spray substance,
wherein the spraying controller is further configured to reduce a rotating speed of the rotor in the one or more border areas to be smaller than a rotating speed of the rotor in the field area.

5. The spraying support system according to claim 4,
wherein the sprayer portion has a plurality of the rotors, and
wherein the spraying controller is further configured to control rotating speeds of the plurality of rotors such that the rotating speeds of the plurality of rotors are increased to be larger when the plurality of rotors are located in the field area than when the plurality of rotors are located in the one or more border areas.

6. The spraying support system according to claim 3,
wherein the sprayer portion has a plurality of rotors to spray the spray substance, and
wherein when the working machine is located in the one or more border areas and one or more of the plurality of rotors are located closer to the contour of the field to be sprayed than another one or more of the plurality of rotors are to the contour of the field to be sprayed, the spraying controller is further configured to reduce a rotating speed of the one or more of the plurality of rotors to be smaller than a rotating speed of the other one or more of the plurality of rotors.

7. The spraying support system according to claim 1,
wherein the sprayer portion has a rotor to spray the spray substance, and
wherein the spraying controller is further configured to control a rotating speed of the rotor.

8. The spraying support system according to claim 7,
wherein the working machine has: a prime mover; and a PTO shaft to be rotated by the prime mover,
wherein the sprayer includes: a motor; and a power transmission mechanism, including at least a plurality of gears, configured to transmit power from the PTO shaft and the motor to the rotor, and
wherein the spraying controller is further configured to change a rotating speed of the motor with a rotating speed of the PTO shaft kept constant in controlling the sprayer portion.

9. The spraying support system according to claim 1,
wherein the working machine includes a traveling vehicle to tow the sprayer device, and
wherein the traveling vehicle has a display configured to display any of the spraying plans.

10. The spraying support system according to claim 1,
wherein the sprayer has a display configured to display any of the spraying plans.

11. The spraying support system according to claim 1,
wherein, in each of the spraying plans created by the server, the corresponding one of the fields is divided in a plurality of areas and the spraying information includes spraying amounts of the spray substance set for the respective plurality of areas, and
wherein the spraying controller is further configured to control the sprayer portion to spray the spray substance on a per-area basis in the following manner: when the working machine starts traveling after the spraying controller extracts the spraying plan which is the one of the spraying plans, the spraying controller is further configured to:
determine, based on the extracted spraying plan and the machine position, an area which is one of the plurality of areas and in which the working machine is located;
select a spraying amount which is one of the spraying amounts and which corresponds to the determined area; and control the sprayer portion based on the selected spraying amount to spray the spray substance in the determined area.

12. A spraying support system for a working machine, comprising:
- a server, including at least a processor and memory, configured to:
  - create, for respective fields in which a spray substance is sprayed, spraying plans each representing a relation between field information relating to a corresponding one of the fields and spraying information including spraying amount of the spray substance,
  - register, as the field information, field position information representing a position of the corresponding one of the fields, and
  - store a plurality of types of agricultural maps representing data relating to agriculture for each of the fields;
- a plan obtainer, including either a communicator configured to perform wireless communication with the server, or a connection terminal configured to receive an electronic storage medium, provided to the working machine having a sprayer configured to spray the spray substance, and configured to obtain the spraying plans created by the server; and
- a spraying controller, including at least a processor, configured to control a sprayer portion of the sprayer based on the spraying information of any one of the spraying plans obtained by the plan obtainer device;
- a position detector, including at least a receiver configured to receive satellite positioning data, configured to detect a machine position showing a position of the working machine; and
- an external terminal, connected to the server and including at least a display and a processor, configured to:
  - allow selection of a field which is one of the fields for creation of one of the spraying plans by the server, and
  - allow selection of one type of agricultural map which is one of the plurality of types of agricultural maps corresponding to the selected field,
- wherein the server extracts data of the selected one type of agricultural map, sets spraying amounts for the selected field based on the extracted data, and creates the one of the spraying plans representing a relation between the field information relating to the selected field and the spraying information including the set spraying amounts, and
- wherein the spraying controller is further configured to control the sprayer portion to spray the spray substance in the following manner: the spraying controller device is configured to:
  - identify a field which is one of the fields and in which the sprayer is configured to spray the spray substance based on the machine position and the field position information; and
  - control the sprayer portion based on the spraying information of the field in which the sprayer is configured to spray the spray substance.

13. The spraying support system according to claim 12, wherein the external terminal is further configured to:
- display the selected field divided in a plurality of areas;
- allow for an operator to input a spraying amount of the spray substance for each of the plurality of areas of the selected field; and
- display portion to display the data of the selected one type of agricultural map,
- wherein the selected one type of agricultural map represents, on a per-area basis, the data relating to agriculture for the selected field divided in the plurality of areas, and
- wherein the spraying support system is further configured to allow input of the spray amount of the spray substance for each of the plurality of areas of the selected field into the external terminal while causing the external terminal to display the selected field and the data of the selected one type of agricultural map next to each other.

14. The spraying support system according to claim 12, wherein the external terminal is further configured to:
- allow for an operator to input time for spraying the spray substance in the selected field, and
- wherein the server is further configured to include, in the one of the spraying plans, information indicating the time inputted in the external terminal.

* * * * *